United States Patent
Serval et al.

(10) Patent No.: US 11,561,123 B2
(45) Date of Patent: Jan. 24, 2023

(54) SMART SCALE SYSTEMS AND METHODS OF USING THE SAME

(71) Applicant: Mateo, Neuilly-sur-Seine (FR)

(72) Inventors: Thomas Serval, Neuilly-sur-Seine (FR); Gauthier de Rouzé, Reims (FR)

(73) Assignee: MATEO, Neuilly-sur-Seine (FR)

( * ) Notice: Subject to any disclaimer, the term of this patent is extended or adjusted under 35 U.S.C. 154(b) by 0 days.

(21) Appl. No.: 17/463,163

(22) Filed: Aug. 31, 2021

(65) Prior Publication Data

US 2021/0396569 A1    Dec. 23, 2021

Related U.S. Application Data

(63) Continuation of application No. PCT/IB2020/053686, filed on Apr. 17, 2020.

(60) Provisional application No. 62/957,210, filed on Jan. 4, 2020, provisional application No. 62/836,476, filed on Apr. 19, 2019.

(51) Int. Cl.
*G01G 19/50* (2006.01)
*G06N 5/02* (2006.01)
*G01G 17/08* (2006.01)

(52) U.S. Cl.
CPC ............ *G01G 17/08* (2013.01); *G01G 19/50* (2013.01); *G06N 5/022* (2013.01)

(58) Field of Classification Search
CPC ...... G01G 17/08; G01G 19/44; G01G 19/445; G01G 19/50; G01G 23/163
See application file for complete search history.

(56) References Cited

U.S. PATENT DOCUMENTS

| | | | |
|---|---|---|---|
| 10,489,788 B1* | 11/2019 | Edwards | A61B 5/0077 |
| 2002/0066602 A1* | 6/2002 | Bliss | G01G 23/3735 |
| | | | 177/25.13 |
| 2015/0331524 A1* | 11/2015 | McMillen | G01L 5/0019 |
| | | | 345/174 |
| 2016/0187181 A1* | 6/2016 | Gupta | G01G 3/125 |
| | | | 177/177 |
| 2017/0146390 A1* | 5/2017 | Kovacs | A61B 5/0205 |
| 2018/0008168 A1* | 1/2018 | Pearlman | A61G 7/0527 |
| 2018/0035918 A1 | 2/2018 | Emalfarb | |
| 2019/0050955 A1 | 2/2019 | Beaudet | |
| 2020/0110194 A1* | 4/2020 | Young | A61B 5/6891 |
| 2020/0132539 A1* | 4/2020 | Hall | A61B 5/0537 |
| 2021/0202091 A1* | 7/2021 | Receveur | G16H 40/67 |

(Continued)

FOREIGN PATENT DOCUMENTS

| CN | 108362365 A | * | 8/2018 |
| JP | 2012-070989 A | | 4/2012 |

OTHER PUBLICATIONS

International Search Report in International Application No. PCT/IB2020/053686, dated Jul. 16, 2020 (4 pages).

*Primary Examiner* — Natalie Huls
(74) *Attorney, Agent, or Firm* — Nixon Peabody LLP

(57) ABSTRACT

A method for determining a normalized weight of a non-static item is disclosed. Weight data associated with the non-static item is received from a plurality of load cells. A load cell weight for the non-static item is determined based at least in part on the weight data. The load cell weight for the non-static item is received as an input for a machine learning algorithm. The normalized weight for the non-static item is generated as an output for the machine learning algorithm.

20 Claims, 18 Drawing Sheets

(56) References Cited

U.S. PATENT DOCUMENTS

2021/0361239 A1\* 11/2021 Chahine ................ A61B 5/053
2021/0393158 A1\* 12/2021 Kodama ................ A61B 5/05

\* cited by examiner

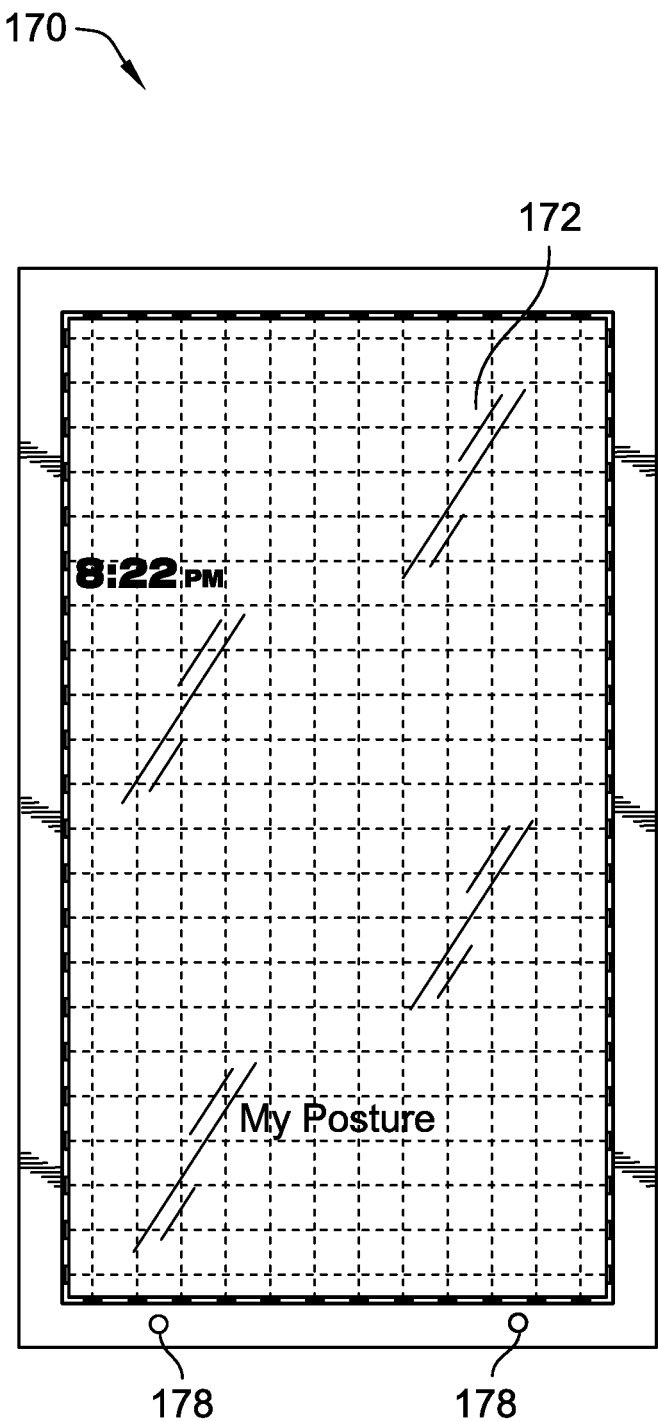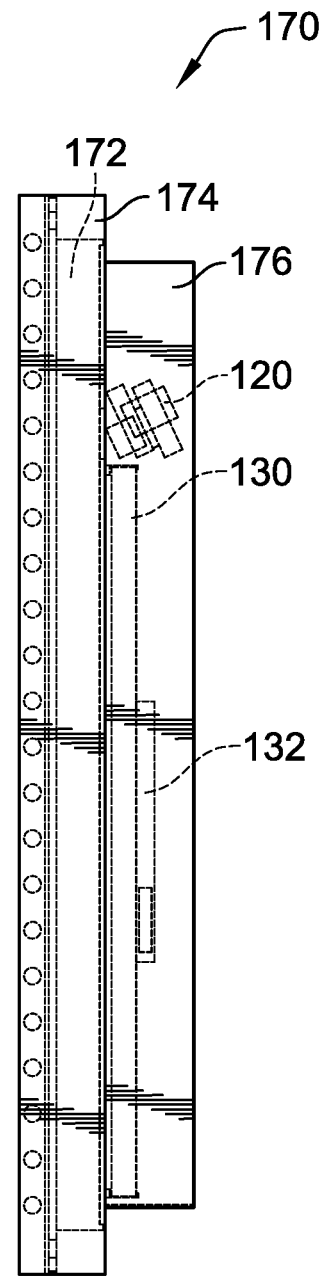
FIG. 6A          FIG. 6B

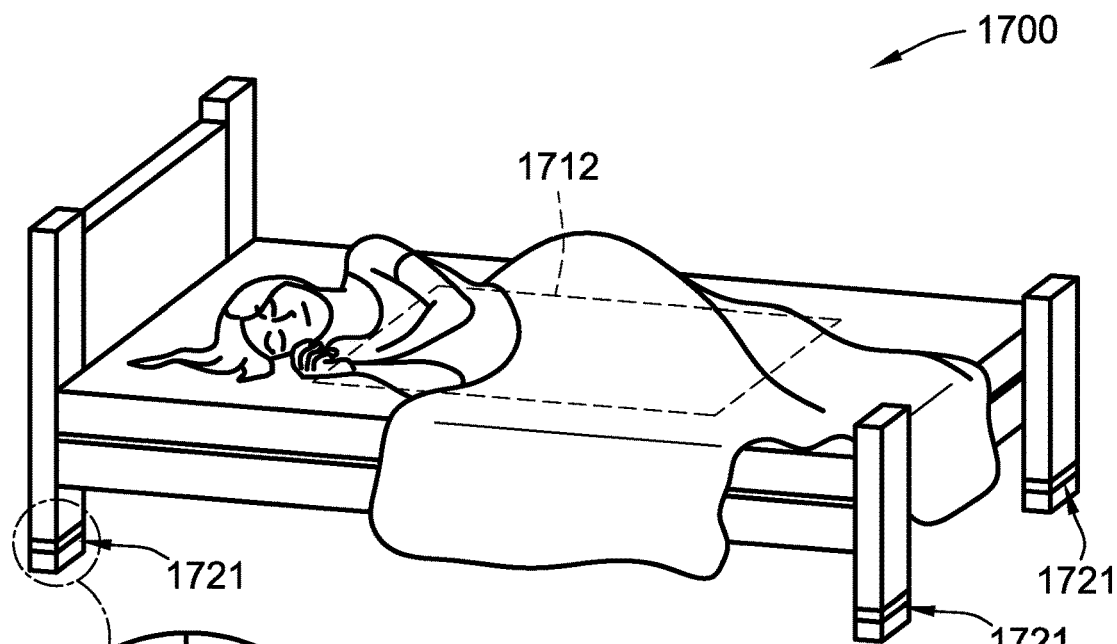
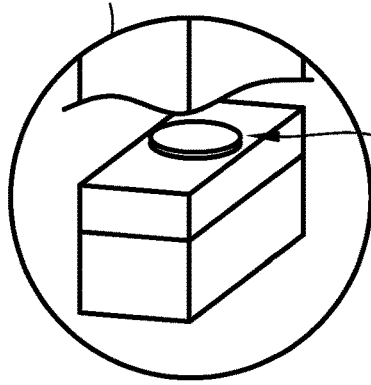
FIG. 19A
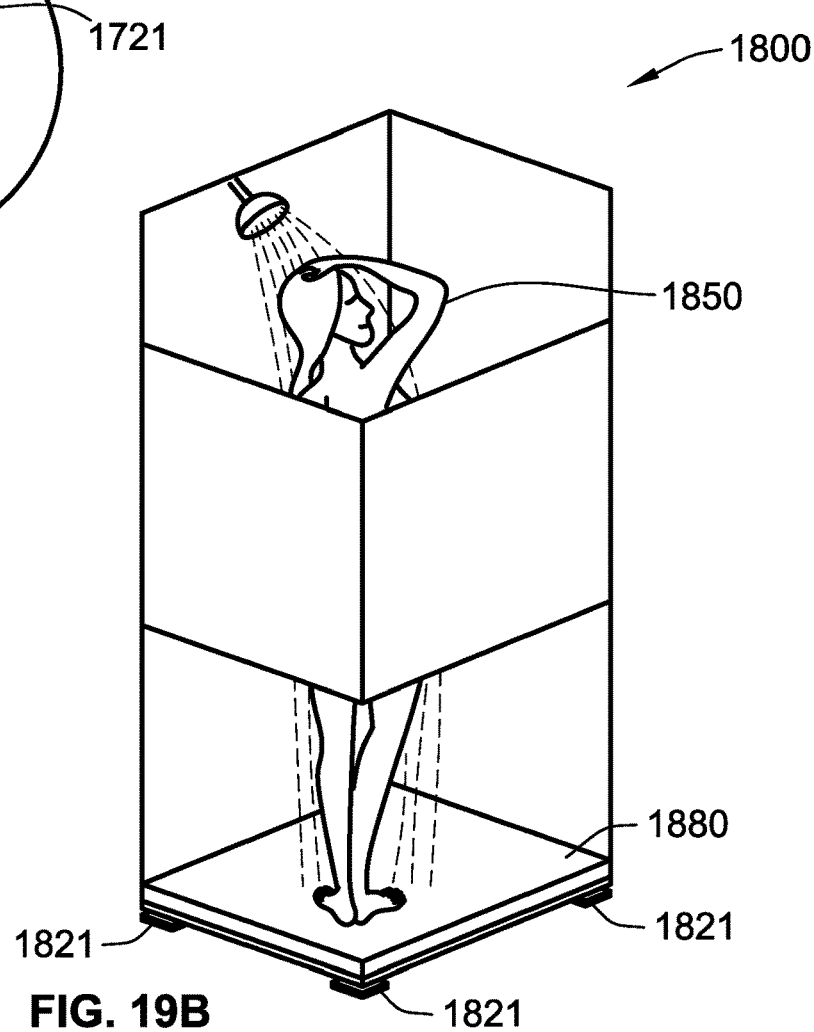
FIG. 19B

SMART SCALE SYSTEMS AND METHODS OF USING THE SAME

CROSS-REFERENCE TO RELATED APPLICATIONS

This application is a continuation of International Application No. PCT/IB2020/053686, filed Apr. 19, 2019, which claims priority to and the benefit of U.S. Provisional Patent Application No. 62/836,476, filed Apr. 19, 2019, and U.S. Provisional Patent Application No. 62/957,210, filed Jan. 4, 2020, each of which is hereby incorporated by reference herein in its entirety.

TECHNICAL FIELD

The present disclosure relates to health products, and more specifically, to smart scale systems and/or smart mat systems.

BACKGROUND

Consumers are increasingly focused on health and health-related products. We focus on our weight, what we eat, how we stand, and so on. Thus, a need exists for a multi-use apparatus that generates health-related information of a user. The present disclosure is directed to addressing these needs and solving other problems.

SUMMARY

According to some implementations of the present disclosure, a method for determining a normalized weight of a non-static item is disclosed. Weight data associated with the non-static item is received from a plurality of load cells. A load cell weight for the non-static item is determined based at least in part on the weight data. The load cell weight for the non-static item is received as an input for a machine learning algorithm. The normalized weight for the non-static item is generated as an output for the machine learning algorithm.

In some implementations, the machine learning algorithm further receives, as the input, a category of the non-static item. In some implementations, the category of the non-static item includes a person, an animal, an inanimate object, or any combination thereof.

In some implementations, the category of the non-static item further includes a cat, a dog, a horse, a hamster, a guinea pig, a rabbit, a chinchilla, a mouse, a rat, a parrot, a hermit crab, a ferret, a reptile, a fish, a sea monkey, or any combination thereof.

In some implementations, historical data associated with the non-static item is received. The historical data includes historical load cell weight data and historical normalized weight data. The machine learning algorithm is trained with the historical data. In some implementations, the historical data is associated with other non-static items of a same category. In some implementations, the historical data is associated with the non-static item of a smart scale system, which includes the plurality of load cells.

In some implementations, the plurality of load cells is configured to generate the weight data in response to the non-static item engaging a smart scale system, which includes the plurality of load cells. In some implementations, the non-static item engaging the smart scale system includes (i) the non-static item standing on a cover layer of the smart scale system, (ii) the non-static item moving across the cover layer of the smart scale system, or (iii) both.

In some implementations, pressure data associated with the non-static item is received from an array of pressure sensors. In some implementations, the array of pressure sensors is configured to generate the pressure data in response to the non-static item engaging a smart scale system, which includes the array of pressure sensors.

In some implementations, a pressure heat map associated with the non-static item is generated based at least in part on the pressure data. In some implementations, the pressure heat map is representative of a pressure gradient associated with feet or paws of the non-static item and indicative of a weight distribution of the non-static item.

In some implementations, the array of pressure sensors is coupled to a mattress of the non-static item. The pressure data during a sleep session of the non-static item is received from the array of pressure sensors. Based at least in part on the pressure data during the sleep session of the non-static item, a sleep status for the non-static item is determined. In some implementations, the sleep status for the non-static item includes (i) whether the non-static item has a sleep disorder, (ii) a sleep quality of the non-static item, or (iii) both.

In some implementations, the weight data during the sleep session of the non-static item is received from the plurality of load cells. Based at least in part on the weight data during the sleep session of the non-static item, a change in weight for the non-static item during the sleep session is determined.

According to some implementations of the present disclosure, a smart scale system includes a plurality of load cells, a control system, and a memory. The plurality of load cells is coupled to a first side of a substrate. The plurality of load cells is configured to generate weight data associated with a non-static item. The control system includes one or more processors. The memory stores thereon machine readable instructions. The control system is coupled to the memory. In some implementations, the memory and the control system are coupled to the first side of the substrate. Any combination of the methods above is implemented when the machine executable instructions in the memory are executed by at least one of the one or more processors of the control system.

In some implementations, the smart scale system further includes a cover layer. In some implementations, the cover layer includes a sheet of fabric. In some implementations, the sheet of fabric includes at least two electrically conductive fabric portions spaced from each other. In some implementations, the at least two electrically conductive fabric portions are spaced from each other at least 3 inches.

In some implementations, the substrate is one or more pieces of glass. In some implementations, the substrate includes two pieces of glass coupled together via one or more hinges. In some implementations, the memory and the control system are coupled to the first side of the substrate.

In some implementations, the smart scale system further includes a plurality of rigid feet. In some implementations, each of the plurality of rigid feet is directly coupled to a respective one of the plurality of load cells.

In some implementations, the smart scale system further includes a base cover. The base cover is coupled to the substrate such that the plurality of load cells, the memory, and the control system are at least partially positioned between the base cover and the substrate. In some implementations, the base cover includes a plurality of apertures, and each of the plurality of rigid feet protrudes at least partially through at least one of the plurality of apertures.

In some implementations, the plurality of load cells includes a four-by-four array of load cells. The four-by-four array of load cells being is to an analog to digital converter. In some implementations, the plurality of load cells includes at least four single load cells, where each of the four single load cells is coupled to a respective analog to digital converter.

In some implementations, the smart scale system further includes an array of pressure sensors coupled to a second opposing side of the substrate. The array of pressure sensors is configured to generate pressure data associated with the non-static item.

In some implementations, the array of pressure sensors includes a first sheet and a second sheet. In some implementations, the first sheet includes a pressure sensitive sheet that is positioned adjacent to the second sheet. In some implementations, the pressure sensitive sheet includes a piezoresistive sheet that is configured to change its electrical resistance in response to pressure being applied thereto.

In some implementations, the second sheet includes a plurality of electrically conductive trace patterns. In some implementations, each of the plurality of electrically conductive trace patterns defines a pressure sensor of the array of pressure sensors. In some implementations, each of the plurality of electrically conductive trace patterns includes an inner disk and an outer ring. In some implementations, the outer ring is an equilateral polygon or a perfect circle.

According to some implementations of the present disclosure, a system for determining a normalized weight of a non-static item is disclosed. The system includes a control system configured to implement the method of any one of claims 1 to 15.

According to some implementations of the present disclosure, a computer program product includes instructions which, when executed by a computer, cause the computer to carry out the method of any one of claims 1 to 15. In some implementations, the computer program product is a non-transitory computer readable medium.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 6A is front elevation view of the smart mirror of the smart scale system of FIG. 5, according to some implementations of the present disclosure;

FIG. 6B is a side elevation view of the smart mirror of the smart scale system of FIG. 5, according to some implementations of the present disclosure;

FIG. 19A illustrates a smart scale system in a bed, according to some implementations of the present disclosure;

FIG. 19B illustrates a smart scale system in a shower, according to some implementations of the present disclosure;

Figure 1:
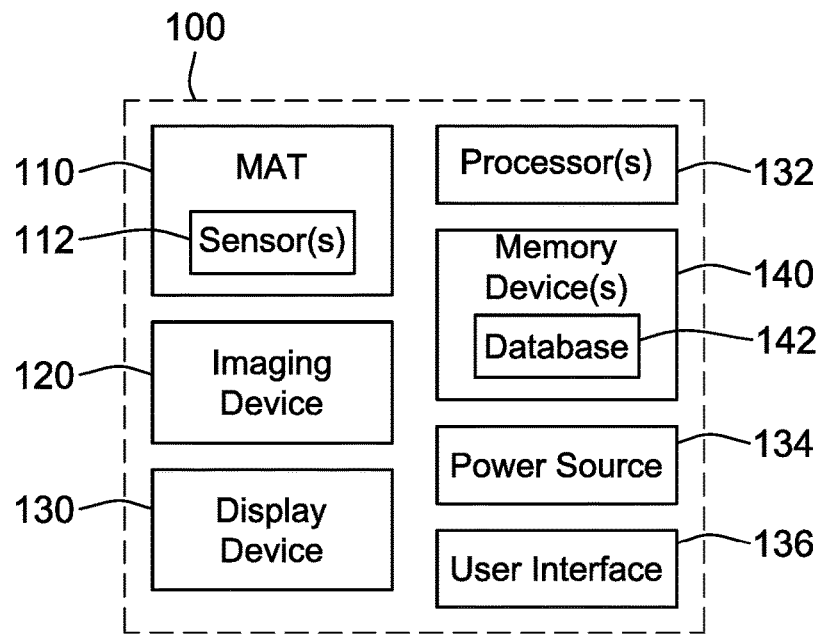
FIG. 1 is an illustrative block diagram of a smart scale system, according to some implementations of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

According to some implementations of the present disclosure, a smart scale for a user to stand on can determine the user's posture, pressure points, weight, and more. At least two different types of pressure sensors can be used: a CMOS sensor and a sensor comprising a thin layer of liquid.

The present disclosure is described with reference to the attached figures, where like reference numerals are used throughout the figures to designate similar or equivalent elements. The figures are not drawn to scale, and are provided merely to illustrate the instant disclosure. Several aspects of the disclosure are described below with reference to example applications for illustration. It should be understood that numerous specific details, relationships, and methods are set forth to provide a full understanding of the disclosure. One having ordinary skill in the relevant art, however, will readily recognize that the disclosure can be practiced without one or more of the specific details, or with other methods. In other instances, well-known structures or operations are not shown in detail to avoid obscuring the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Aspects of the present disclosure can be implemented using one or more suitable processing device, such as general purpose computer systems. microprocessors, digital signal processors, micro-controllers, application specific integrated circuits (ASIC), programmable logic devices (PLD), field programmable logic devices (FPLD), field programmable gate arrays (FPGA), mobile devices such as a mobile telephone or personal digital assistants (PDA), a local server, a remote server, wearable computers, tablet computers, or the like.

Memory storage devices of the one or more processing devices can include a machine-readable medium on which is stored one or more sets of instructions (e.g., software) embodying any one or more of the methodologies or functions described herein. The instructions can further be transmitted or received over a network via a network transmitter receiver. While the machine-readable medium can be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding, or carrying a set of instructions for execution by the machine and that cause the machine to perform any one or more of the methodologies of the various implementations, or that is capable of storing, encoding, or carrying data structures utilized by or associated with such a set of instructions. The term "machine-readable medium" can accordingly be taken to include, but not be limited to, solid-state memories, optical media, and magnetic media. A variety of different types of memory storage devices, such as a random access memory (RAM) or a read only memory (ROM) in the system or a floppy disk, hard disk, CD ROM, DVD ROM, flash, or other computer readable medium that is read from and/or written to by a magnetic, optical, or other reading and/or writing system that is coupled to the processing device, can be used for the memory or memories.

Referring generally to FIG. 1, a smart scale system 100 for determining a user profile for a user can include a mat 110, an imaging device 120 (such as a camera, a video recorder, or the like), a display device 130, a processor 132, and a memory device 140. The mat 110 includes a first sensor 112 configured to output pressure data. The imaging device 120 can be configured to generate image data reproducible as one or more images of a user. The memory device 140 can be configured to receive and store therein the pressure data from the first sensor 112 and the image data from the imaging device 120. The memory device 140 can store machine-readable instructions that are configured to cause the processor 132 to determine that a portion of the user is in contact with the mat 110 based on the pressure data, the image data, or both. The processor 132 can be further caused to determine a user profile for the user based on the pressure data, the image data, or both. The user profile includes a posture of the user. The posture of the user can be determined by comparing the pressure data, the image data, or both, to one or more predetermined postures stored in the memory device 140. The predetermined postures may be stored in a database 142 of the memory device 140. The processor 132 can also be caused to display, on the display device 130, information associated with the determined user profile. Optionally, the smart scale system 100 includes a power source 134 and a user interface 136.

In some implementations, the memory device 140 can be configured to cause the processor 132 to determine an identity of the user based on the pressure data, the image data, or both. The determining process can be carried out by, for example, a machine learning algorithm. As an example, the user profile includes a shape of the portion of the user (e.g., a foot, a hand, or the like), a dimension of the portion of the user, or the like, or any combination thereof. In such example, the displayed information associated with the determined user profile includes a first indicium indicative of the weight of the user, a second indicium indicative of the posture of the user, a third indicium indicative of the shape of the portion of the user, a fourth indicium indicative of the dimension of the portion of the user, or the like, or any combination thereof.

In some implementations, the mat 110 includes a second sensor (not shown) configured to output temperature data. In such implementations, the memory device 140 can be further configured to cause the processor 132 to determine that the portion of the user is in contact with the mat 110 based on the pressure data, the image data, the temperature data, or any combination thereof. The first sensor 112 may be the same as, or different from, the second sensor.

In some implementations, the smart scale system 100 includes a user interface 136. For example, the user interface 136 can be coupled to the display device 130. The user interface 136 can be configured to receive input data associated with the user. As an example, the input data includes age or gender of the user.

The memory device 140 of the smart scale system 100 can be further configured to cause the processor 132 to determine a wellness plan for the user based on the determined user profile, and the displayed information associated with the determined user profile can then include an indicium indicative of wellness of the user. For example, the wellness plan is an exercise schedule.

The memory device 140 of the smart scale system 100 can also be configured to cause the processor 132 to determine a posture score based on the comparing the pressure data, the image data, or both, to the one or more predetermined postures store in the database 142 of the memory device 140. For example, the posture score can be indicative of poor posture of the user. In some implementations, the memory device 140 can be configured to cause the processor 132 to determine a posture correction plan associated with the user based on the comparing the pressure data, the image data, or both, to the one or more predetermined postures.

In some implementations, the display device 130 is coupled to the mat 110. For example, the mat 110 includes one or more LED lights. The processor 132 can be configured to cause the display device 130 to display a shape indicative of a position for the user to place his or her hands or feet on the mat 110. This can be useful in various situations, such as in the instance where the mat 110 is a yoga mat, and the smart scale system 100 is configured to display yoga postures suggested to the user by recommending placement for the user's hands and/or feet.

In some implementations, the memory device 140 of the smart scale system 100 can be configured to cause the processor 132 to determine an active period based on the determining that the portion of the user is in contact with the mat 110. In some such implementations, the smart scale system 100 can further include a virtual reality device (not shown) configured to receive the pressure data from the first sensor 112 and the image data from the camera 120 during the active period and display digital information based on the received data. As an example, the display device 130 can be coupled to the virtual reality device.

In some implementations, one or more components of the smart scale system 100 includes, be a part of, or be used in conjunction of, an augmented reality system. The augmented reality system can be configured to show how the user should correct his or her posture via, for example, an augmented reality display device (e.g., the user sees himself or herself in an outline showing a corrective posture and then the user can try to align his or her spine to the outline).

In some implementations, the mat 110 of the smart scale system 100 is configured to pair with a mobile phone. For example, the display device 130 is coupled to the mobile phone. The mat 110 can be paired with one, two, three, or any other number of mobile phones. The mat 110 can also be paired with one or more different devices. In some other implementations, the mat 110 of the smart scale system 100 works in a standalone mode (e.g., without a mobile device).

In some implementations, one or more components of the smart scale system 100 includes, be a part of, or be used in conjunction of, an artificial intelligence system. For example, the artificial intelligence system can be stored in the cloud, at the edge (e.g., IoT Edge), or in any combination thereof.

While the smart scale system 100 is shown in FIG. 1 as including a mat 110, one or more sensors 112, an imaging device 120, a display device 130, one or more processors 132, one or more memory devices 140, a database 142, a power source 134, and a user interface 136, alternative systems that are the same as, or similar to, the smart scale system 100 can be constructed with more or less components. For example, a first alternative system (not shown) includes a mat, a pressure sensor, a temperature sensor, a camera, a display device, a processor, and a memory device.

Figure 2:
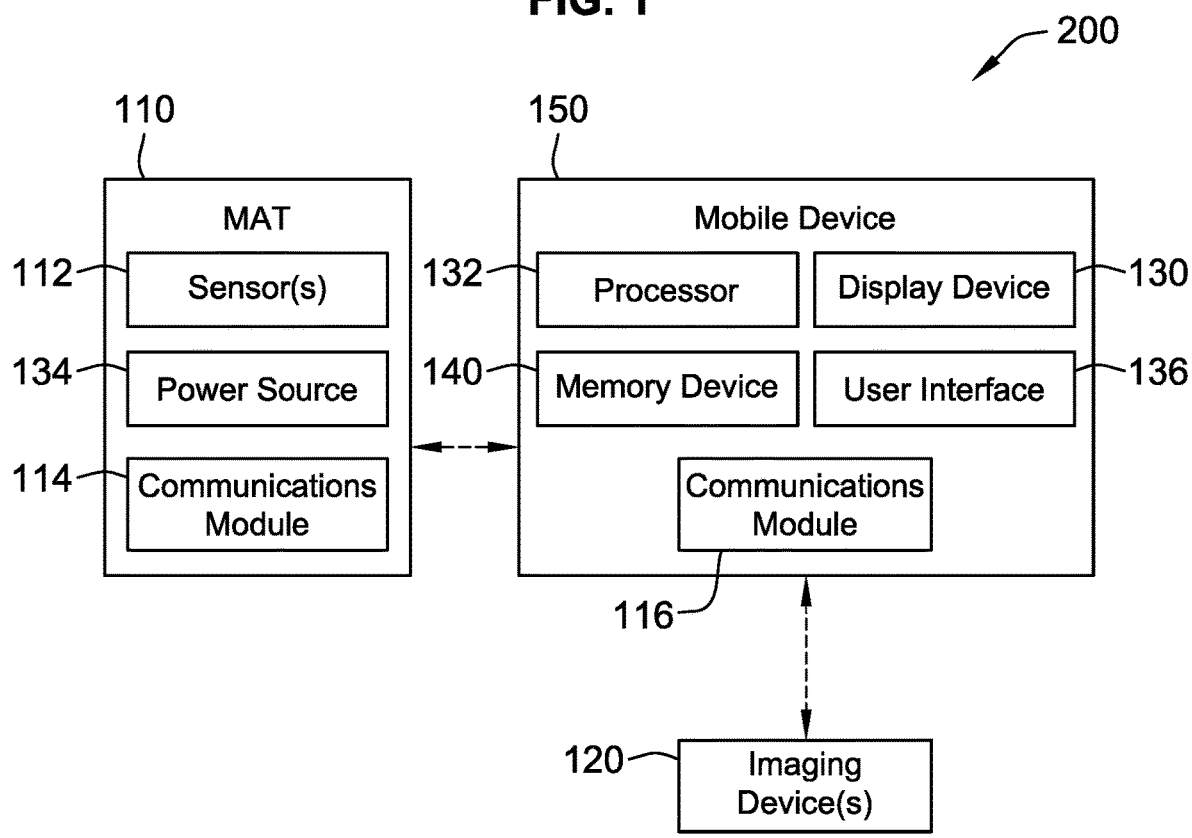
FIG. 2 is an illustrative block diagram of the smart scale system of FIG. 1, according to some other implementations of the present disclosure.

FIG. 2 illustrates an exemplary implementation of the present disclosure, a smart scale system 200 is the same as, or similar to, the smart scale system 100, except that the various components can be coupled to different devices. For example, the smart scale system 200 includes the mat 110, the imaging device 120, and a mobile device 150. The mat 110 includes the sensor 112, a power source 134, and a communications module 114. The mobile device 150 includes the processor 132, the memory device 140, the display device 130, the user interface 136, and a communications module 116. The mat 110 can be communicatively coupled to the mobile device 150 via the communications modules 114 and 116. Similarly, the imaging device 120 can be communicatively coupled to the mobile device 150. Additionally or alternatively, the imaging device 120 can be directly coupled to the mobile device 150. As another example, the devices can be coupled to one another via Bluetooth or BLE.

For example, the power source 134 includes a battery and an energy harvesting element configured to harvest energy for charging the battery. The energy harvesting element can be a transducer configured to convert thermal energy into electrical energy for charging the battery. In some instances, the transducer can be coupled to a second sensor configured to output temperature data (such as the one described above). Alternatively or additionally, the energy harvesting element can be a transducer configured to convert mechanical energy (e.g., vibrations from someone standing on the mat or exercising on the mat) into electrical energy for charging the battery.

Figure 3:
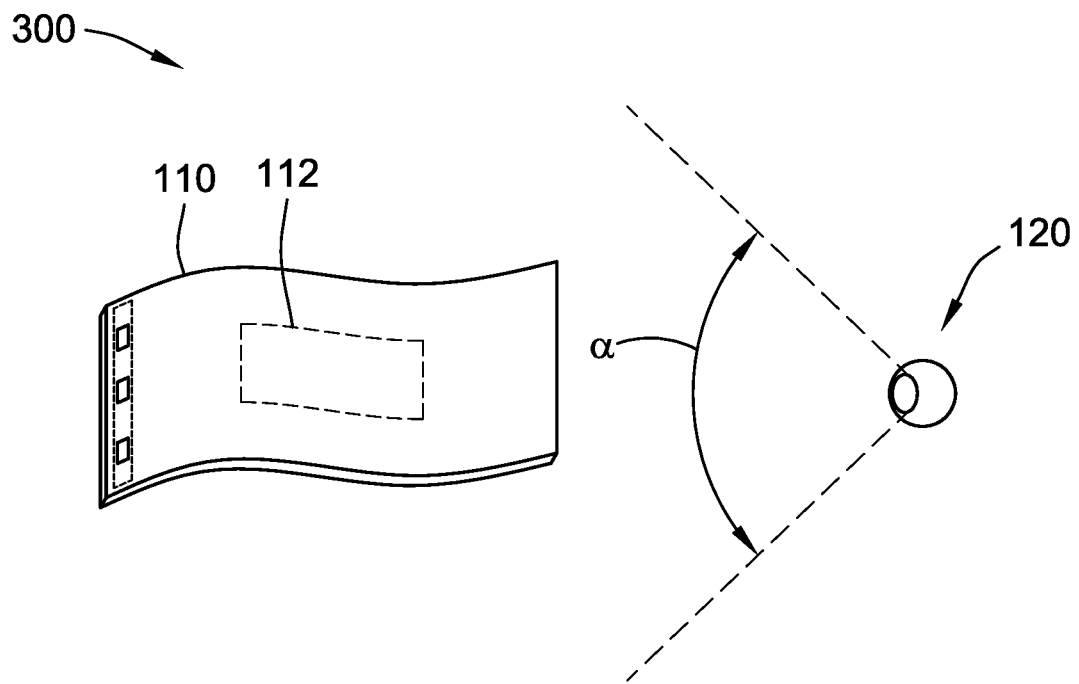
FIG. 3 is a top view of a smart scale system, according to some implementations of the present disclosure.
Figure 4:
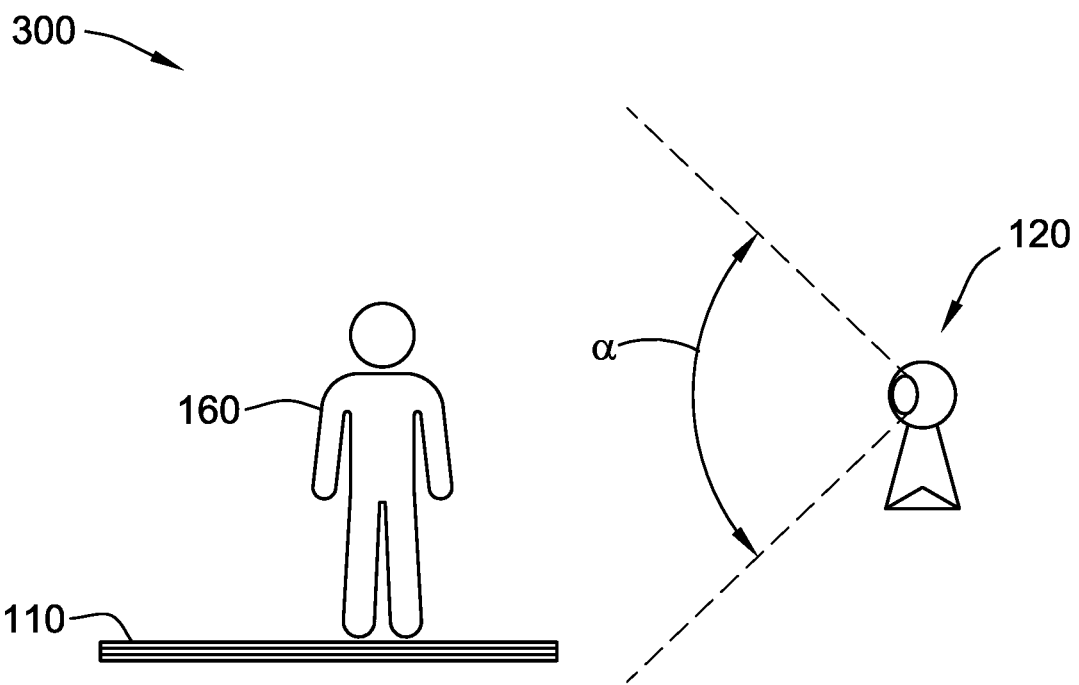
FIG. 4 is a side elevation view of a smart scale system, according to some implementations of the present disclosure.

FIGS. 3 and 4 illustrate a smart scale system 300 including the mat 110 and the camera 120. The mat 110 includes the sensor 112 configured to sense pressure data associated with a user 160. The camera 120 has a field of view a configured to cover at least a portion of the user 160 and the mat 110. The user 160 can be instructed to turn at an angle towards the camera 120 in order to get various image data for the camera 120 at different angles.

Figure 9:
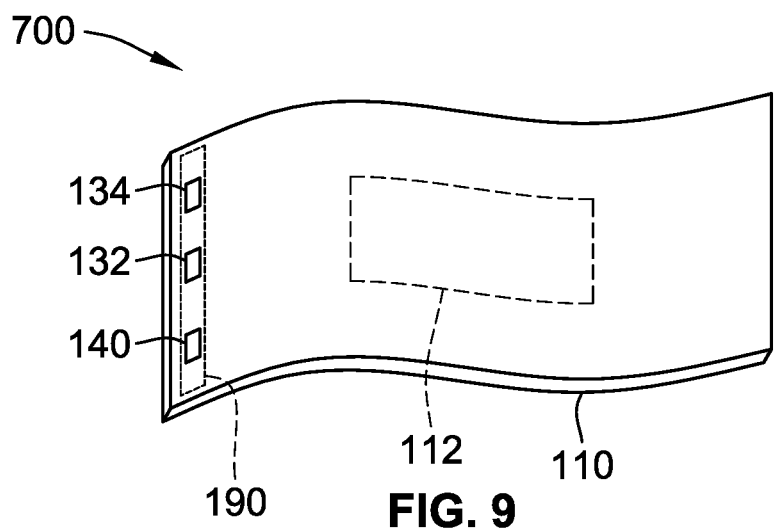
FIG. 9 is a perspective view of a mat of a smart scale system in a first configuration, according to some implementations of the present disclosure.
Figure 10:
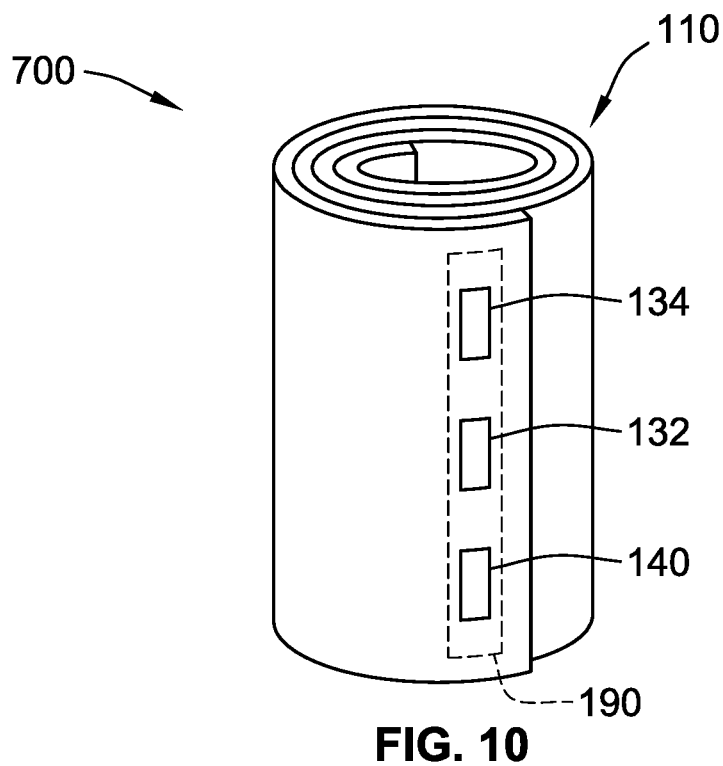
FIG. 10 is a perspective view of the mat of FIG. 9 in a second configuration, according to some implementations of the present disclosure.

Various components of the smart scale system 100 can be coupled to various devices. In addition to the implementation such as that of the smart scale system 200, the processor 132 and the memory device 140 can be coupled to the mat 110 (FIGS. 9 and 10). The display device 130 can be coupled to a mirror (FIGS. 5, 6A, and 6B), a carpet, the mat 110, or the mobile device 150 (FIG. 2).

Figure 5:
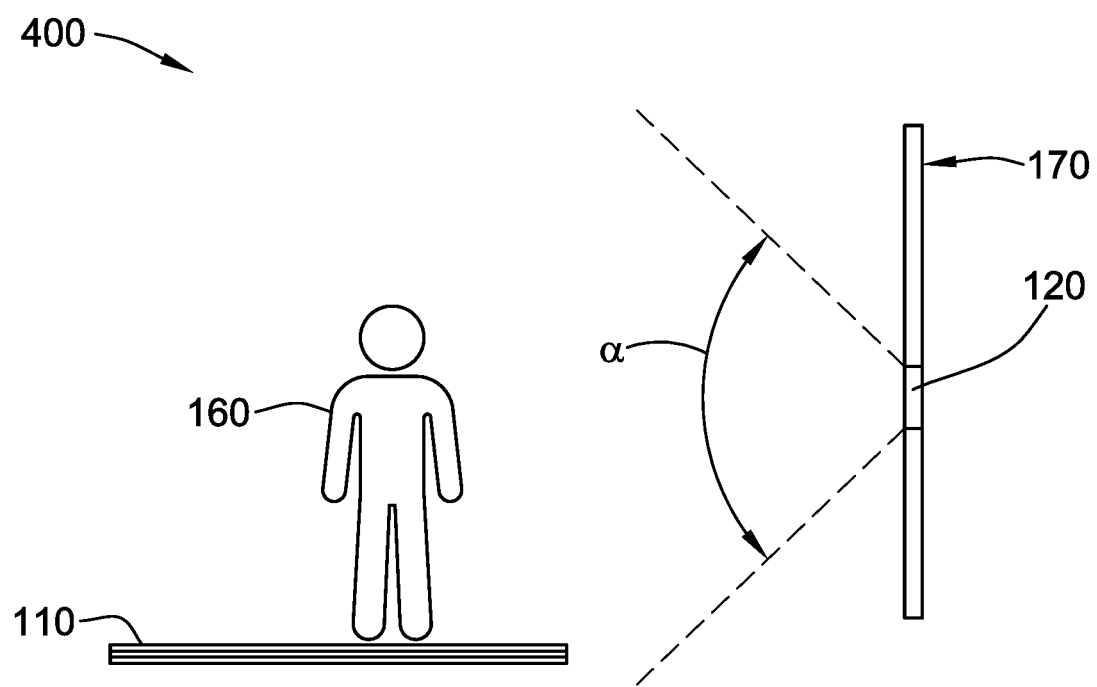
FIG. 5 is a side elevation view of a smart scale system, according to some implementations of the present disclosure.

FIG. 5 illustrates a smart scale system 400 including the mat 110 and a smart mirror 170. The camera 120 can be coupled to the smart mirror 170. The camera 120 of the smart mirror 170 has a field of view β configured to cover at least a portion of the user 160 and the mat 110.

FIG. 6A illustrates a front elevation view of the smart mirror 170 of the smart scale system 400, while FIG. 6B illustrates a side elevation view of the smart mirror 170. As can be seen in FIG. 6A, the frame surrounds the mirror 172, while portions of the display device 130 that are activated are visible through the mirror 172. FIG. 6B also shows the two-dimensional grid that can be formed by the mirror sensors in the frame that is used to detect the user's face, head, or other body part. This two dimensional grid is generally not visible to the user during operation.

FIG. 6B shows the arrangement of the frame with the mirror sensors, the mirror 172, the display device 130, and the camera. In an embodiment, the processor 132 and the memory device 140 can be mounted behind the display device 130. In other embodiments, the processor 132 and the memory may be located at other portions within the smart mirror 170, or can be located external to the smart mirror 170 entirely. The smart mirror 170 generally also includes housing components 174 and 176 that form a housing that contains and protects the display device 130, the camera, and the processor 132.

Figure 7:
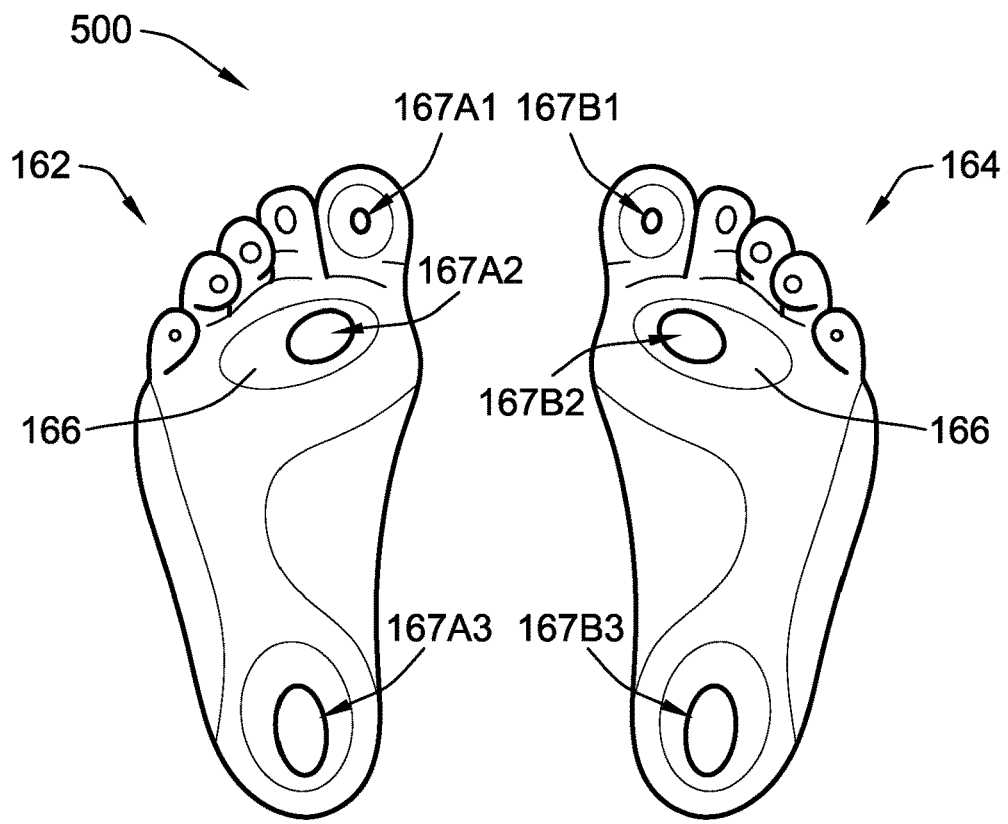
FIG. 7 illustrates a pressure map of the feet of a user of a smart scale system, according to some implementations of the present disclosure.

In some implementations, the sensor 112 of the mat 110 can be configured to sense pressure data, as illustrated in FIG. 7 showing a pressure map 166 of the feet 162 and 164 of the user. The pressure map 166 is representative of a pressure gradient associated with the feet 162, 164 of the user. Further, the pressure map 166 is indicative of a weight distribution of the user.

Used in conjunction with the pressure map 166 or without the pressure map 166, the pressure data can be used to generate additional information associated with the user. As a first example, in some implementations, a length of a foot of the user can be calculated. Additionally, in some implementations, based at least in part on the calculated length of the foot, a shoe size for the user can be estimated. As a second example, in some implementations, a foot profile for the user can be determined. The foot profile can include a selection among a high arc, a low arc, and a medium arc. As a third example, in some implementations, an insole profile for the user can be determined. Additionally, in some implementations, based at least in part on the insole profile, a custom insole may be created for the user (e.g., using 3D printing).

As shown, the pressure map 166 includes pressure points 167A1, 167A2, 167A3 for the foot 162. The pressure map 166 further includes pressure points 167B1, 167B2, 167B3 for the foot 164. In some implementations, the pressure map 166 can aid in detecting whether the user has diabetic foot. A diabetic foot often has fluid buildup and/or lost nerves, which can be detected using electrodes (FIGS. 12A-13B) and/or a pressure sensor. As a first example, the area of the diabetic foot can go up over time, resulting in an enlargement of the pressure map 166 over time. As a second example, the pressure distribution differs over time (e.g., the pressure points 167's move over time and/or enlarge over time). In some implementations, instead of analyzing the pressure data over time, pressure data of a current user can be compared with pressure data of other users (some with diabetic foot and some without). In some implementations, the pressure map 166 can aid in detecting other ailments and/or illnesses, such as joint diseases.

Figure 8:
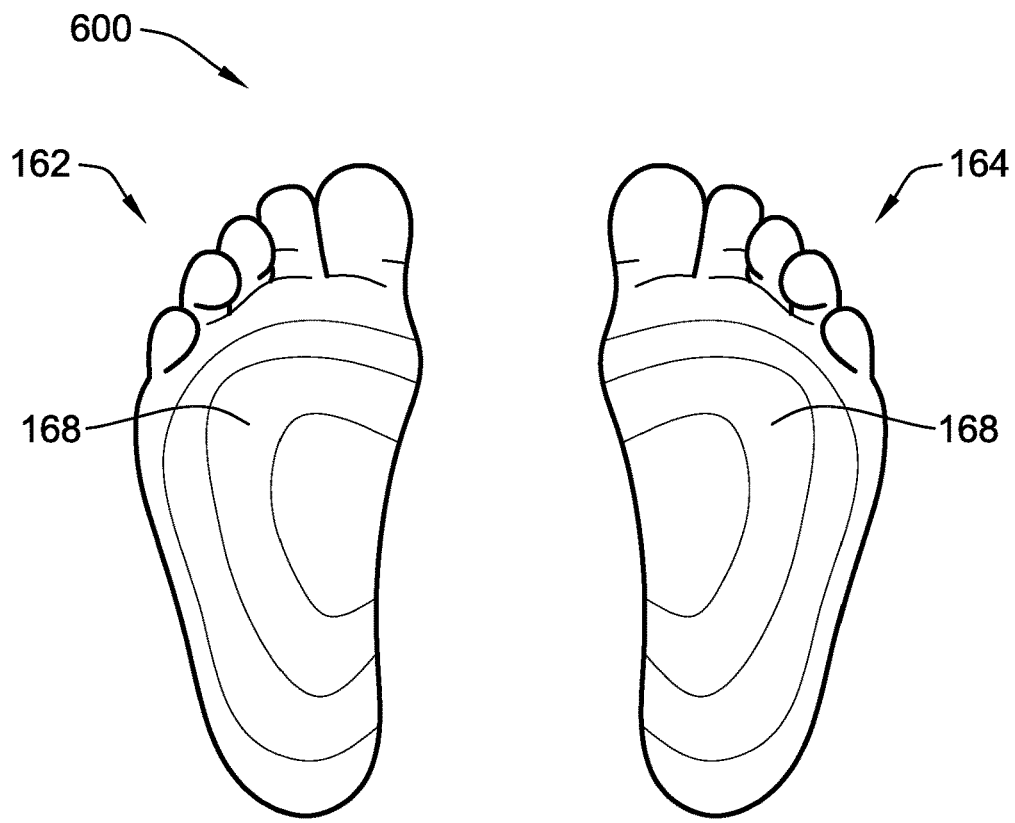
FIG. 8 illustrates a temperature map of the feet of a user of a smart scale system, according to some implementations of the present disclosure.

In some implementations, the sensor 112 of the mat 110 can be configured to sense temperature data, as illustrated in FIG. 8 showing a temperature map 168 of the feet 162 and 164 of the user. The heat from the user can be used to power the battery of the power source 134, such as the one illustrated in FIG. 2 of the present disclosure.

Referring to FIGS. 9 and 10, the mat 110 can be flexible, or stretchable, or both, as shown in the smart scale system 700. For example, the mat 110 can be configured to move between a generally planar configuration (FIG. 9) to a generally cylindrical configuration (FIG. 10). For example, the power source 134, the processor 132, and the memory device 140 can be coupled to a side portion 190 of the mat 110, such that when the mat 110 is rolled into a cylindrical configuration, the side portion 190 of the mat 110 remains relatively flat.

Figure 11:
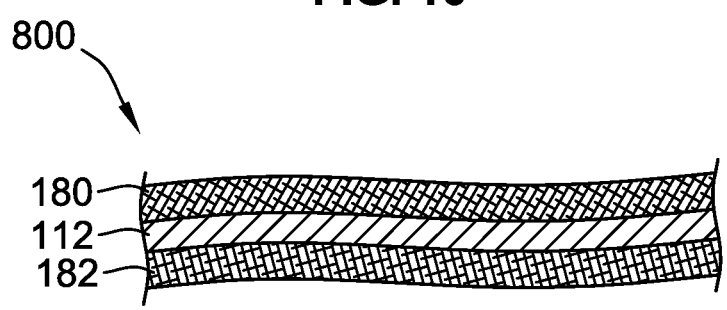
FIG. 11 is a sectional view of a mat of a smart scale system, according to some implementations of the present disclosure.

In some implementations, the first sensor 112 can be a CMOS integrated silicone pressure sensor, or a piezoelectric sensor. In some implementations, the first sensor 112 includes an embedded layer of liquid capable of sensing pressure. For example, the first sensor 112 can be a layer stacked pressure sensor comprising a liquid metal-embedded elastomer. As best shown in FIG. 11, the smart scale system 800 includes a top layer 180, a bottom layer 182, and a middle layer (e.g., the sensor 112) between the top layer 180 and the bottom layer 182. The top layer 180 can be made of fabric, rubber, or any other suitable material. Similarly, the bottom layer 182 can be made of fabric, rubber, or any other suitable material.

Figure 12A:
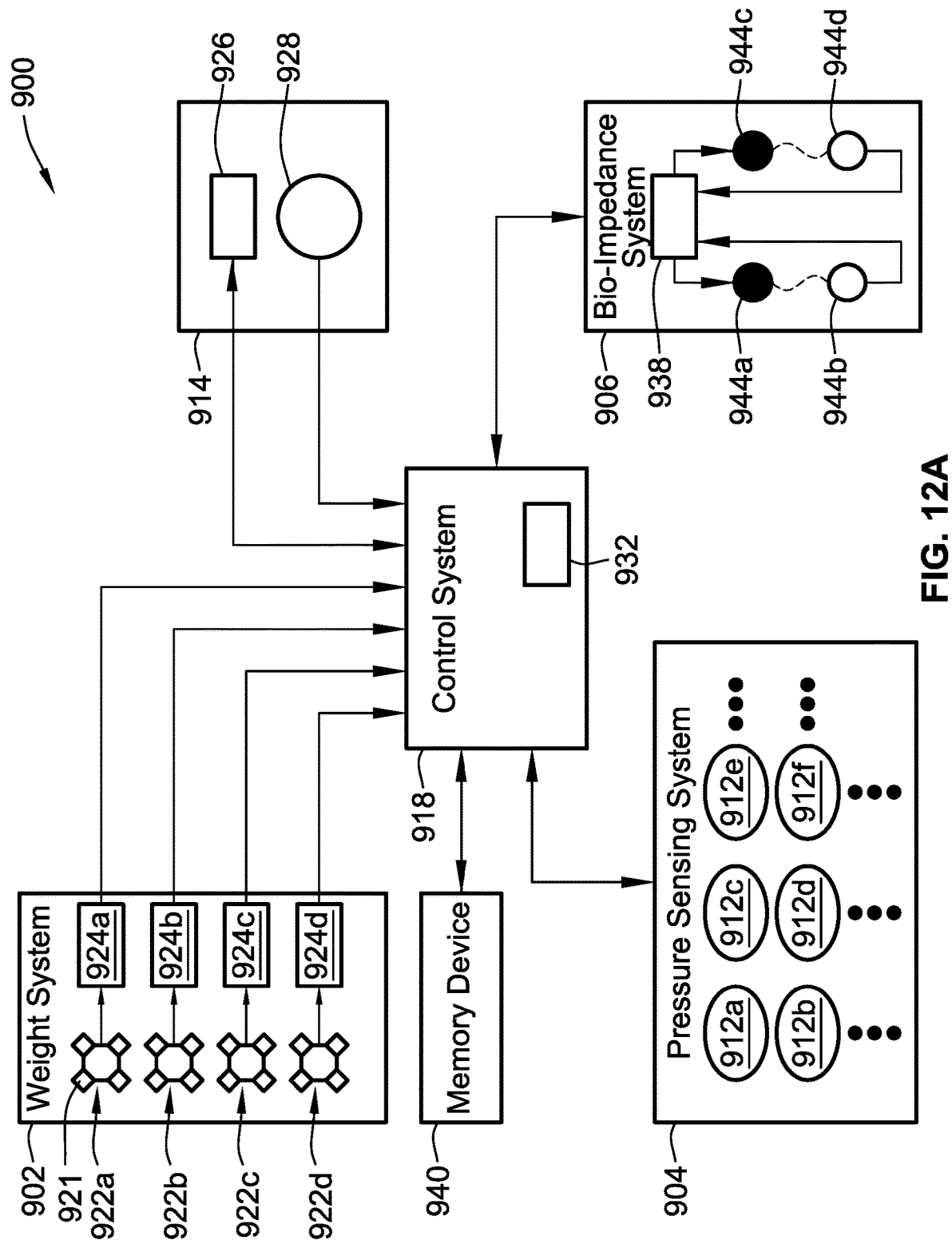
FIG. 12A is an illustrative block diagram of a smart scale system, according to some implementations of the present disclosure.

Referring now to FIG. 12A, a smart scale system 900 is illustrated, according to some implementations of the present disclosure. The smart scale system 900 is the same as, similar to, or used in conjunction with the smart scale systems of FIGS. 1-11, where like reference numbers are used to designate similar or equivalent components. In some implementations, one or more components of the smart scale system 900 form a smart mat, such as a bath mat or a yoga mat.

The smart scale system 900 is used to determine a normalized weight of a user, among other uses. The smart scale system 900 includes a control system 918, a memory device 940, one or more processors 932, a weight system 902, and a pressure sensing system 904. In some implementations, the smart scale system 900 further includes a bio-impedance system 906. In some implementations, the smart scale system 900 further includes a communications network 914.

As shown in FIG. 12A, the control system 918 includes the one or more processors 932 (hereinafter, processor 932). The control system 918 is generally used to control (e.g., actuate) the various components of the system 900 and/or analyze data obtained and/or generated by the components of the system 900. The processor 932 can be a general or special purpose processor or microprocessor. While one processor 932 is shown in FIG. 12A, the control system 918 can include any suitable number of processors (e.g., one processor, two processors, five processors, ten processors, etc.) that can be in a single housing, or located remotely from each other. The control system 918 can be coupled to and/or positioned within a mat of the system 900, within a housing of one or more load cells 921 of the weight system

902, within a housing of one or more of the sensors 912 of the sensing system 904, or any combination thereof. The control system 918 can be centralized (within one such housing) or decentralized (within two or more of such housings, which are physically distinct). In such implementations including two or more housings containing the control system 918, such housings can be located proximately and/or remotely from each other.

The memory device 940 stores machine-readable instructions that are executable by the processor 932 of the control system 918. The memory device 940 can be any suitable computer readable storage device or media, such as, for example, a random or serial access memory device, a hard drive, a solid state drive, a flash memory device, etc. While one memory device 940 is shown in FIG. 12A, the system 900 can include any suitable number of memory devices 940 (e.g., one memory device, two memory devices, five memory devices, ten memory devices, etc.). The memory device 940 can be coupled to and/or positioned within a mat of the system 900, within a housing of one or more load cells 921 of the weight system 902, within a housing of one or more of the sensors 912 of the sensing system 904, within a housing of a user interface (e.g., a mobile phone, a smart mirror), or any combination thereof. Like the control system 918, the memory device 940 can be centralized (within one such housing) or decentralized (within two or more of such housings, which are physically distinct.

In some implementations, the system 900 further includes an electronic interface (such as the user interface 136 of FIGS. 1-2). The electronic interface is configured to receive data (e.g., user input data) such that the data can be stored in the memory device 940 and/or analyzed by the processor 932 of the control system 918. The electronic interface can communicate one or more components of the system 900 using a wired connection or a wireless connection (e.g., using an RF communication protocol, a WiFi communication protocol, a Bluetooth communication protocol, over a cellular network, etc.). The electronic interface can include an antenna, a receiver (e.g., an RF receiver), a transmitter (e.g., an RF transmitter), a transceiver, or any combination thereof. The electronic interface can also include one more processors and/or one more memory devices that are the same as, or similar to, the processor 932 and the memory device 940 described herein. In other implementations, the electronic interface is coupled to or integrated (e.g., in a housing) with the control system 918 and/or the memory device 940.

In some implementations, the weight system 902 of the smart scale system 900 includes a plurality of load cells 921. For example, as shown in FIG. 12A, the weight system 902 includes four of four-by-four arrays of load cells: 922a, 922b, 922c, and 922d. Each of the four-by-four arrays of load cells is coupled to a respective analog to digital converter (ADC). For example, the array of load cells 922a is coupled to the ADC 924a; the array of load cells 922b is coupled to the ADC 924b; the array of load cells 922c is coupled to the ADC 924c; and the array of load cells 922d is coupled to the ADC 924d.

In some implementations, the pressure sensing system 904 of the smart scale system 900 includes an array of pressure sensors. In some such implementations, the array of pressure sensors includes a matrix of pressure sensors of any suitable number. As an example, as shown in FIG. 12A, the array of pressure sensors includes a 3×2 matrix of pressure sensors: 912a-912f. As another example, the array of pressure sensors includes a 100×70 matrix of pressure sensors. Additional details and/or alternative implementations of the pressure sensing system 904 is discussed with regard to FIG. 12B, FIGS. 13A-13B, and their corresponding description. Further, an example output (e.g., a heat map) of the pressure sensing system 904 is shown in FIG. 7.

In some implementations, the control system 918 is configured to receive weight data from the weight system 902, and to receive pressure data from the pressure sensing system 904. Every user has a unique pressure map (e.g., like a finger print), as generated by the pressure data associated with the user. Based at least in part on the pressure data (received from the pressure sensing system 904) and registered user data (stored on the memory device 940 and/or transmitted from the communications network 914), the control system 918 is configured to determine whether that the user is a registered user or a non-registered user of the smart scale system 900.

If the user is a non-registered user of the smart scale system, in some implementations, based at least in part on a determination that a portion of the user is in contact with the smart scale system, a camera is activated to generate image data of the user. The determination can be made based at least in part on the weight data, the pressure data, or both. The generated image data is then compared with the registered user data, thereby verifying that the user is a non-registered user of the smart scale system.

In some implementations, the plurality of load cells in the weight system 902 is configured to only measure weight up to a certain amount. The pressure sensing system 904 is configured to pick up the task of measuring weight, if the weight of the user exceeds the amount measurable by the weight system 902. Therefore, in some implementations, a load cell weight for the user is determined based on the received weight data. If the load cell weight does not exceed a predetermined threshold, the load cell weight is displayed on a display device as an actual weight for the user. If the load cell weight exceeds the predetermined threshold, (i) a pressure sensor weight is estimated for the user based at least in part on the received pressured data, and (ii) the pressure sensor weight is displayed on the display device as the actual weight for the user.

In some implementations, the weight for the user, as measured by the weight system, is not accurate enough to reflect the true weight of the user, and the smart scale system 900 can normalize it. First, a load cell weight for the user is determined based on the received weight data. The determined load cell weight is received as a first input for a machine learning algorithm. In addition, a reason for adjustment is received as a second input for the machine learning algorithm. The machine learning algorithm then generates an output, which is a normalized weight of the user. Additionally, in some implementations, the load cell weight for the user, and/or the normalized weight for the user, and/or the reason for adjustment are displayed on a display device.

The reason for adjustment can include (i) a state of the user being dressed or undressed (e.g., clothes may add weight, different types of clothes may add various amounts of weight), (ii) a status of the user's recent use of bathroom (e.g., lack of bowel movement may add weight), (iii) a time when the user last ate and/or drank (e.g., recent consumption of food or beverage may add more weight), (iv) a type of food of the user's last meal (e.g., consuming carbohydrates and/or sodium may increase water retention), (v) a shower status (e.g., having wet hair may add weight); or (vi) any combination thereof.

Further, the machine learning algorithm can be trained with historical data. For example, in some implementations, the historical data includes historical load cell weight data and historical normalized weight data. The historical data can be associated with other users (e.g., registered user data of other users), and/or the current user of the smart scale system (e.g., from a third party activity tracker associated with the current user, or other activity tracking databases). In some implementations, the machine learning algorithm can be trained with sensor data measured by other sensors of the smart scale system. For example, in some such implementations, the data given by the plurality of electrodes 944 can be used to determine whether the user is wet or not.

If the user is a registered user of the smart scale system 900, a prompt is displayed on a display device for the user to input information to be associated with the received weight data. User information is then received in response to the prompt. Based at least in part on the received user information, the weight data is modified to output a normalized weight. Additionally, in some implementations, the modified weight data is displayed on the displayed device. The user information can include the same, or similar information as the reason for adjustment discussed herein. Similarly, the machine learning algorithm can be used if the user is a registered user. The machine learning algorithm can be further or alternatively trained using user specific data that is generated, over a period of time, by the user of the smart scale system 900.

In some implementations, the bio-impedance system 906 of the smart scale system 900 is configured to generate bioelectrical impedance data associated with the user. The bioelectrical impedance system 906 includes a plurality of electrodes 944 configured to conductively contact the user and form one or more closed circuits with the user. For example, as shown in FIG. 12A, a first pair of electrodes 944a, 944b forms a first closed circuit with the user (e.g., with a first foot of the user), and is configured to generate current data to be transmitted to a bioelectrical impedance module 938. A second pair of electrodes 944c, 944d forms a second closed circuit with the user (e.g., with a second foot of the user), and is configured to generate voltage data to be transmitted to the bioelectrical impedance module 938. Based at least in part on the bioelectrical impedance data (including the current data and the voltage data), the control system 918 is configured to determine an estimated body composition of the user, such as a body fat and a muscle mass of the user.

In some implementations, the communications network 914 of the smart scale system 900 includes a wireless communications module 926 and a pairing button 928. The wireless communications module 926 an include a BLE module, and/or a Wi-Fi module. The pairing button 928 can be physical or virtual. In some implementations, actuation of the pairing button 928 enables the control system to transmit data to and/or from the wireless communications module 926. In some implementations, the pairing button 928 is a wireless button. For example, in some such implementations, the pairing button 928 includes a Near Field Communication (NFC) button.

While the smart scale system 900 in FIG. 12A is shown to include the control system 918, the memory device 940, the weight system 902, the pressure sensing system 904, the bio-impedance system 906, and the communications network 914, a smart scale system can include more or fewer components. As an example, in some implementations, a first alternative smart scale system can include a control system, a weight system, and a sensing system. As another example, in some implementations, a second alternative smart scale system can include a control system, a memory device, a weight system, a pressure sensing system, and a display device. As yet another example, in some implementations, a third alternative smart scale system can include a control system, a memory device, a weight system, a pressure sensing system, a bio-impedance system, and a user input module.

Figure 12B:
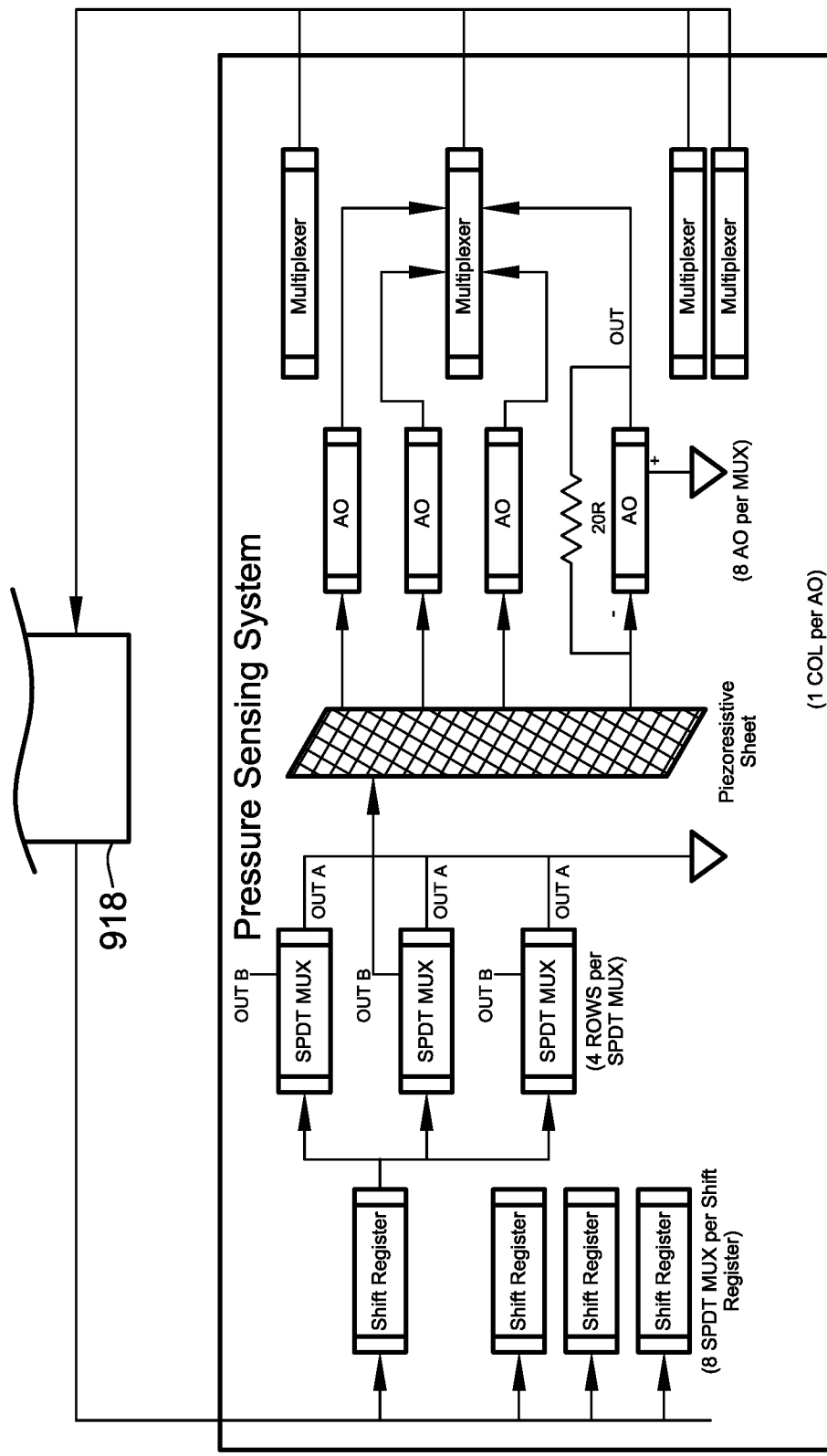
FIG. 12B is an illustrative block diagram of a pressure sensing system of the smart scale system of FIG. 12A.

Referring now to FIG. 12B, an illustrative block diagram of the pressure sensing system 904 is shown, according to some implementations of the present disclosure. In some implementations, a shift register is configured to multiply the number of outputs available; a SPDT MUX is a digitally controlled switch, such as a multiplexer where two possible output is chosen for each input; an AO is an operational amplifier; and a multiplexer CD4051 is a multiplexer where one output is chosen for each input. A main goal of the AO and the SPDT MUX is to avoid an electrical issue common to matrixes of sensors, such as cross-talk. A main goal of the shift register and the simple MUX is to make the reading simpler (fewer inputs and outputs of the control system are needed thanks to them).

In some implementations, the components of the pressure sensing system 904 are coupled to a PCB, which is in turn connected to the control system 918. In some implementations, the PCB is wired to a copper row sheet (e.g., the first sheet 1083 of FIGS. 13A-13B) and a copper column sheet (e.g., the third sheet 1085 of FIGS. 13A-13B). In some such implementations, the PCB is positioned between the substrate 1086 and the base cover 1089 (FIGS. 13A-13B).

Figure 13A:
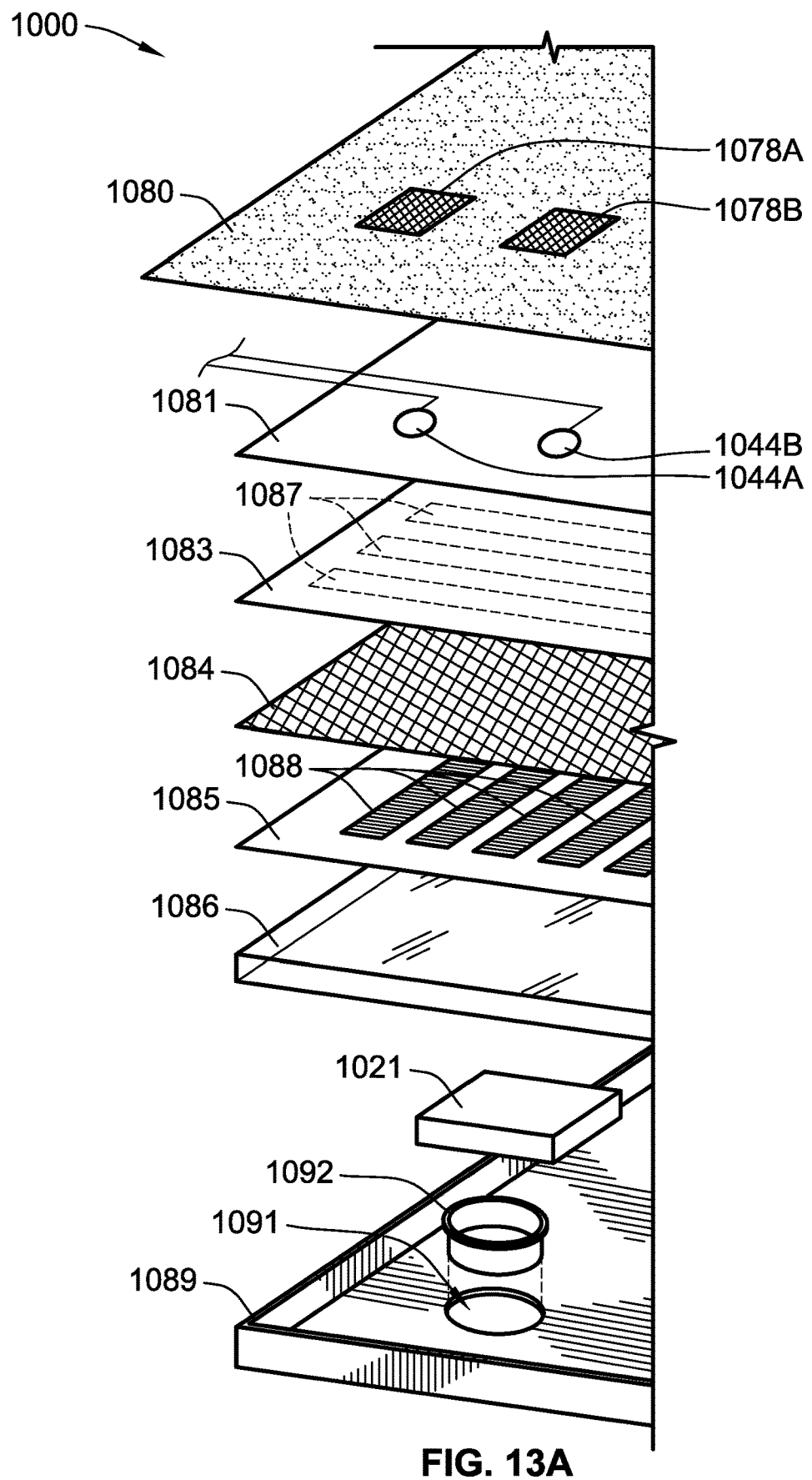
FIG. 13A is a first partial perspective view of a smart scale system, according to some implementations of the present disclosure.
Figure 13B:
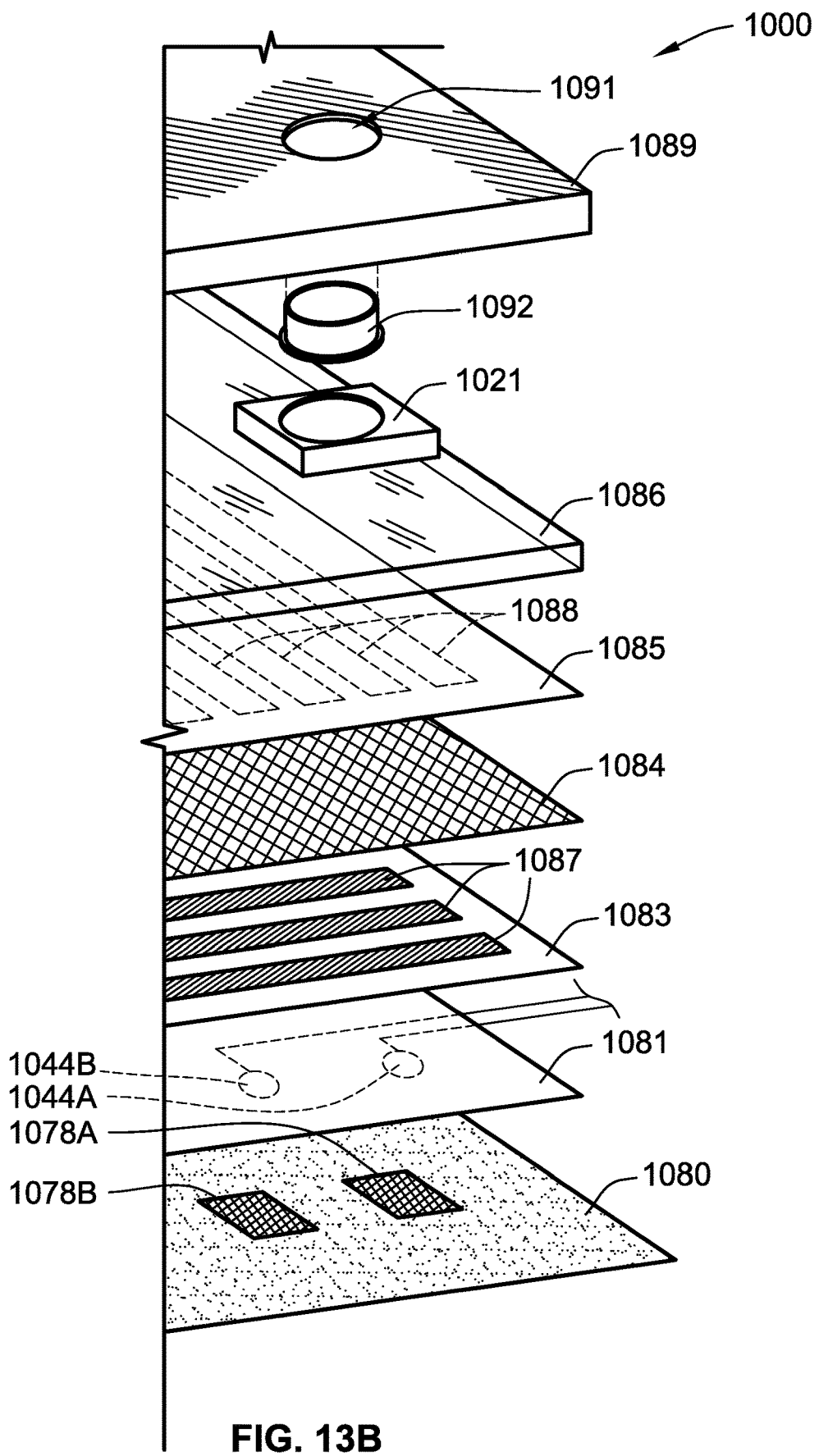
FIG. 13B is a second partial perspective view of the smart scale system of FIG. 13A.

Referring now to FIGS. 13A-13B, a smart scale system 1000 is illustrated. The smart scale system 1000 is the same as, or similar to, the smart scale system 900, where like reference numbers are designated for similar or equivalent elements. More specifically, FIG. 13A is an illustrative partial exploded diagram of a smart scale system, according to some implementations of the present disclosure; and FIG. 13B is a reversed partial exploded diagram of the smart scale system of FIG. 13A, according to some implementations of the present disclosure.

The smart scale system 1000 includes a cover layer 1080 (e.g., a bath mat cover, a top layer), a generally opaque layer 1081, an array of pressure sensors (including a first sheet 1083, a second sheet 1084, and a third sheet 1085), a substrate 1086, a plurality of load cells (including the load cell 1021), a plurality of load feet (including the load foot 1092), and a base cover 1089. As shown, the plurality of load cells is coupled to a first side of the substrate 1086. The array of pressure sensors is coupled to a second opposing side of the substrate 1086. In some implementations, the substrate 1086 is one or more pieces of glass, such as two pieces, four pieces, eight pieces, etc. In some implementations, the substrate 1086 includes two pieces of glass coupled together via one or more hinges, so that the smart scale system 1000 can be folded in half for easy transportation.

In some implementations, the cover layer includes a sheet of fabric. As shown, the cover layer 1080 includes two electrically conductive fabric portions 1078A, 1078B spaced from each other. In some implementations, the two electrically conductive fabric portions 1078A, 1078B are spaced from each other by a suitable distance, such as one inch, two inches, three inches, four inches, five inches, six inches, and up to a width of the cover layer 1080. In some implementations, the two electrically conductive fabric portions 1078A, 1078B are spaced from each other at least three inches. In some implementations, the two electrically conductive fabric portions 1078A, 1078B are spaced from each other at a distance that a user's feet are typically spaced apart.

In some implementations, a plurality of electrodes 1044A, 1044B is positioned between the opaque layer 1081 and the cover layer 1080. Two electrodes 1044A, 1044B are shown in FIGS. 13A-13B. Each of the electrodes 1044A, 1044B is positioned directly below a respective one of the conductive fabric portions 1078A, 1078B. As such, even though the electrodes 1044A, 1044B are not exposed to the user, the electrodes 1044A, 1044B are still conductive via the conductive fabric portions 1078A, 1078B. In other words, in some implementations, the conductive fabric portions are configured to be in electrical physical connection with the electrodes. In some implementations, beneath the cover layer 1080, the opaque layer 1081 is positioned above the various components so that the various components underneath are not visible to human eye.

The array of pressure sensors is configured to generate pressure data associated with the user. In some implementations, the array of pressure sensors is configured to generate the pressure data in response to the user engaging the system (e.g., standing on the cover layer 1080). In some implementations, the array of pressure sensors includes the first sheet 1083, the second sheet 1084, and the third sheet 1085. In some implementations, the first sheet 1083 is a copper rows layer, and includes a plurality of electrically conductive rows 1087. In some implementations, the third sheet 1085 is a copper columns layer, and includes a plurality of electrically conductive columns 1088. In some implementations, the second sheet 1084 is a pressure sensitive sheet, and includes a piezoresistive sheet that is positioned between the first sheet 1083 and the third sheet 1085. The piezoresistive sheet is configured to change its electrical resistance in response to pressure being applied thereto. In some such implementations, the intersection of each of the plurality of electrically conductive rows 1087 with each of the plurality of electrically conductive columns 1088 forms and/or defines a pressure sensor (e.g., the pressure sensor 912 of FIG. 12A) of the array of pressure sensors.

The plurality of load cells being is to generate weight data associated with a user. In some implementations, the plurality of load cells is configured to generate the weight data in response to the user engaging the smart scale system (e.g., standing on the cover layer 1080). In some implementations, each of the plurality of load feet is rigid, and is directly coupled to a respective one of the plurality of load cells. For example, as shown in FIGS. 13A-13B, the rigid load foot 1092 is directly coupled to the load cell 1021. The base cover 1089 is coupled to the substrate 1086 such that the plurality of load cells 1021, the memory, and the control system are at least partially positioned between the base cover 1089 and the substrate 1086. In some implementations, the base cover 1089 includes a plurality of apertures. Each of the plurality of rigid load feet protrudes at least partially through at least one of the plurality of apertures. For example, the load foot 1092 protrudes partially through the aperture 1091 of the base cover 1089. As such, while the load cell 1021 is not exposed to the ground, the load cell 1021 is stabilized via its contact with the load foot 1092, and is effectively stabilized on the ground.

In some implementations, one or more components of the smart scale system 1000 form a smart mat, for example, a bath mat, a yoga mat, a doormat, an anti-fatigue mat, a chair cushion, a body pillow, a shoe insole, a portion of a carpet, one or more pieces of tile, one or more pieces of hardwood flooring, part of a mattress, part of a shower (e.g., coupled to or embedded in a shower pan or a bath tub), or the like. This is advantageous because some people and/or animals can have weight anxiety. Hiding the smart scale system in everyday items can also encourage continual monitoring of the weight, body fat distribution, and/or any health changes of the user. Furthermore, energy harvesting can be included in some of the above-referenced implementations, for example, using heat of the feet and/or dynamic pressure with a piezoelectric collector.

In some implementations, the smart mat includes all of the components shown in FIGS. 13A-13B. The smart mat can be of any suitable dimensions. For example, a length of the smart mat is between about 20 cm to about 250 cm, preferably between about 40 cm to about 120 cm, and most preferably about 80 cm. A width of the smart mat is between about 15 cm to about 120 centimeters, preferably between about 30 cm to about 80 cm, and most preferably about 50 cm. A thickness of the smart mat is between about 5 mm to about 5 cm, preferably between about 8 mm to about 2 cm, and most preferably about 1.5 cm. Additionally or alternatively, in some implementations, the load foot 1092 extends from the base cover 1089 by about 2 mm to about 3 mm.

Figure 14:
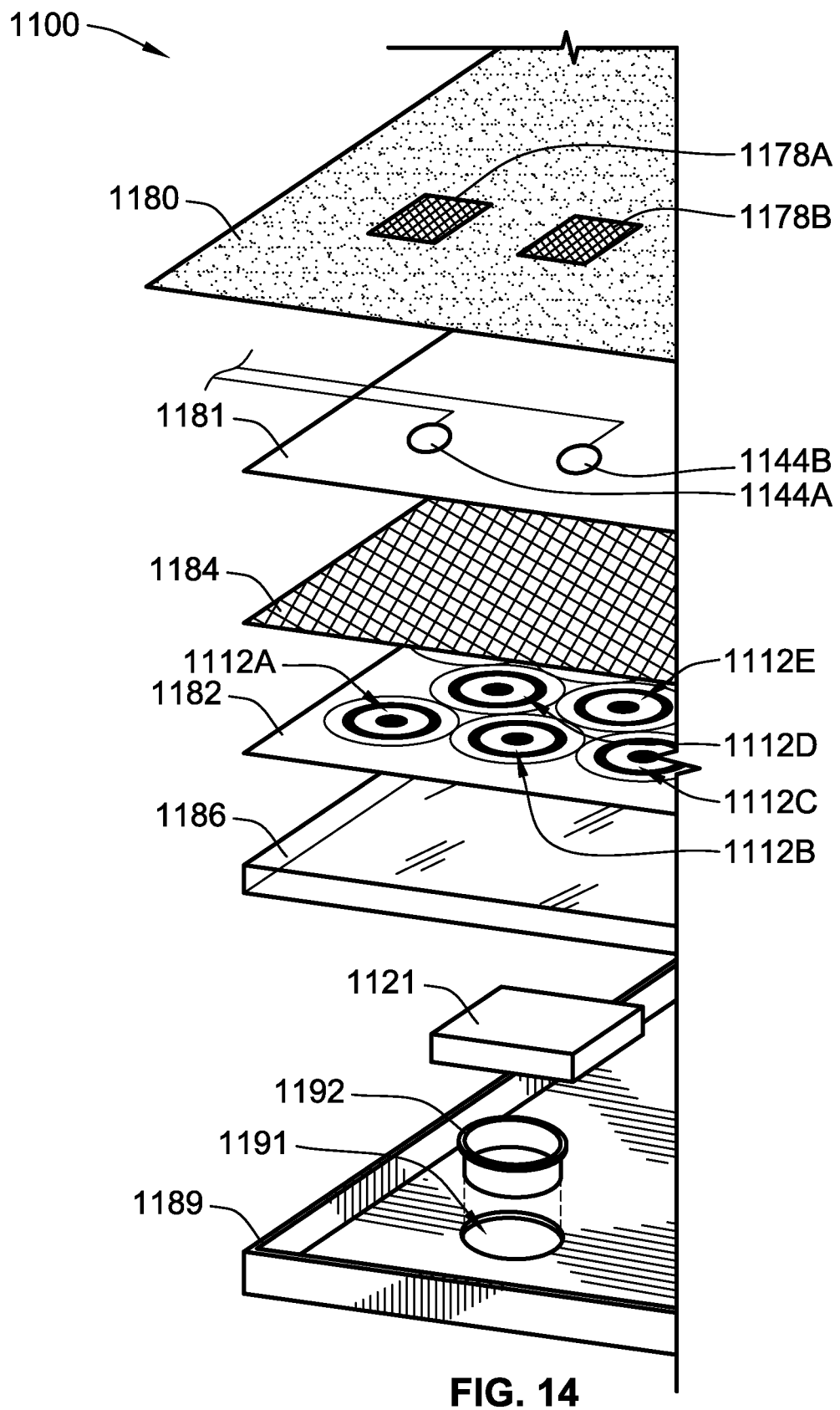
FIG. 14 is a partial perspective view of a smart scale system, according to some implementations of the present disclosure.

Referring to FIG. 14, a partial perspective view of a smart scale system 1100 is shown. The smart scale system 1100 is the same as, or similar to, the smart scale system 1000, where like reference numbers refer to like elements and/or components. However, the array of pressure sensors of the smart scale system 1100 includes two sheets (e.g., a first sheet 1184 and a second sheet 1182 in FIG. 14) instead of three (e.g., the first sheet 1083, the second sheet 1084, and the third sheet 1085 in FIGS. 13A-13B).

As shown, the first sheet 1184 of the smart scale system 1100 is the same as, or similar to, the second sheet 1084 of the smart scale system 1000. In some implementations, the first sheet 1184 is a pressure sensitive sheet, such as a piezoresistive sheet. In some implementations, the first sheet 1184 is flexible. The second sheet 1182 of the smart scale system 1100 replaces the first sheet 1083 and the third sheet 1085 of the smart scale system 1000 at once. In some implementations, the second sheet 1182 includes a printed circuit board (PCB) having a plurality of electrically conductive trace patterns (e.g., 1112A-1112E) thereon. In some such implementations, each of the plurality of electrically conductive trace patterns forms and/or defines a pressure sensor (e.g., the pressure sensor 912 of FIG. 12A) of the array of pressure sensors.

Figure 15A:
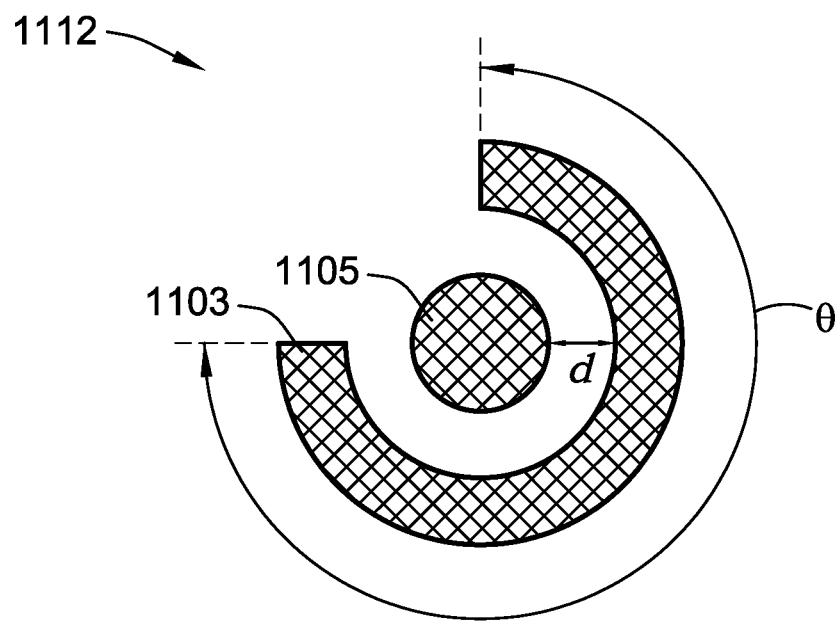
FIG. 15A illustrates a pressure sensor of a smart scale system, according to some implementations of the present disclosure.

Referring now to FIG. 15A, an example pressure sensor formed and/or defined by an electrically conductive trace pattern 1112 is illustrated, according to some implementations of the present disclosure. As shown, the electrically conductive trace pattern 1112 includes an inner disk 1105 and an outer ring 1103. The inner disk 1105 is spaced radially apart from the outer ring 1103 by a first distanced. Examples of the first distance d include: 100 µm, 150 µm, 200 µm, 250 µm, 300 µm, 400 µm, 500 µm, 600 µm, 700 µm, 800 µm, 900 µm, and 1000 µm. In some implementations, the first distance d is 0.8 mm, which is 800 µm.

The outer ring 1103 is formed around the inner disk 1105 for a second distance θ. Examples of the second distance θ include 90°, 135°, 180°, 225°, 270°, 315°, and 360°. As shown in FIG. 14, the electrically conductive trace pattern 1112A has an outer ring that forms a perfect circle around the inner disk, where the second distance θ is 360°. Alternatively, in some implementations, the outer ring 1103 does not form all the way around the inner disk 1105, and therefore has a second distance θ smaller than 360° (best shown in FIG. 15A).

Figure 15B:
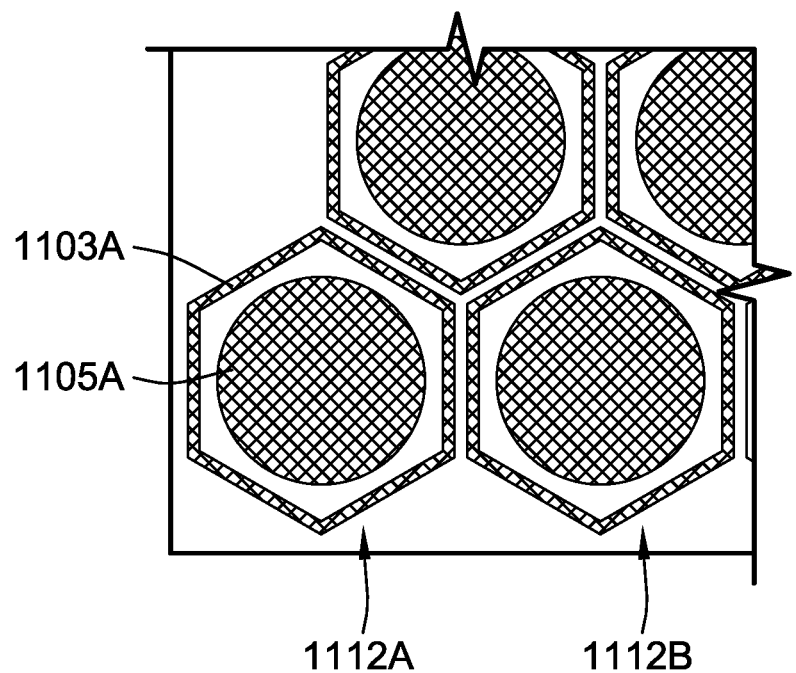
FIG. 15B illustrates a pressure sensing sheet of a smart scale system, according to some implementations of the present disclosure.

Referring now to FIG. 15B, in some implementations, the outer ring of the electrically conductive trace pattern is an equilateral polygon. For example, the electrically conductive trace pattern 1112A is positioned adjacent to the electrically conductive trace pattern 1112B. The electrically conductive trace pattern 1112A includes the inner disk 1105A and the outer ring 1103A, where the outer ring 1103A is an equilateral hexagon. The equilateral hexagon of the outer ring 1103A has six sides, and one side of the outer ring 1103A in the electrically conductive trace pattern 1112A is adjacent to and parallel to one side of the outer ring in the electrically conductive trace pattern 1112B, and so forth. The length for each side is between about 1 mm to about 15 mm, such as 1 mm, 2 mm, 3 mm, 4 mm, 5 mm, 6 mm, 7 mm, 8 mm, 9 mm, 10 mm, 11 mm, 12 mm, 13 mm, 14 mm, or 15 mm.

Figure 16A:
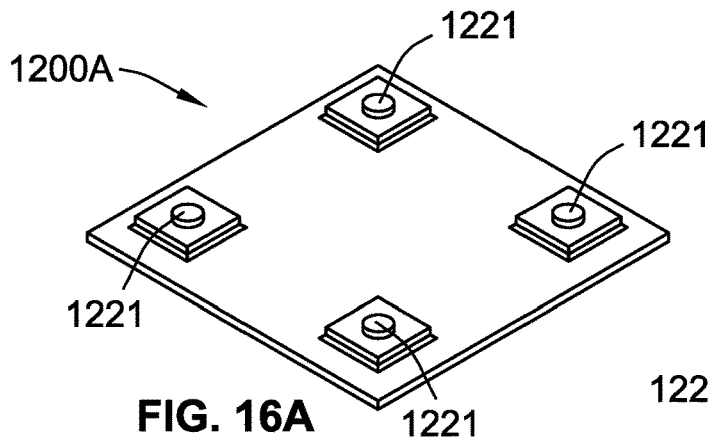
FIG. 16A illustrates a first layout of load cells in a smart scale system, according to some implementations of the present disclosure.

Turning now to FIGS. 16A-16D. FIG. 16A illustrates a first layout 1200A of load cells in a smart scale system (e.g., the smart scale system 100, the smart scale system 200, the smart scale system 300, the smart scale system 400, the smart scale system 700, the smart scale system 800, the smart scale system 900, the smart scale system 1000, and the smart scale system 1100). In this layout 1200A, the plurality of load cells includes four single load cells 1221. In some implementations, in this layout 1200A, the plurality of load cells includes one four-by-four array of load cells described above.

Figure 16B:
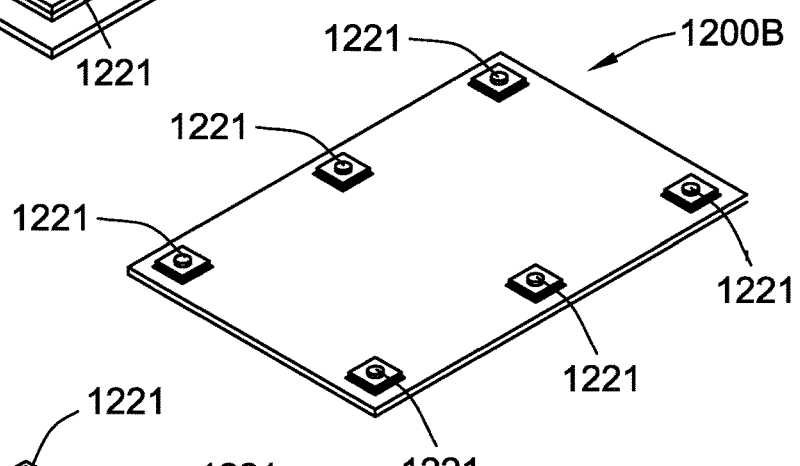
FIG. 16B illustrates a second layout of load cells in a smart scale system, according to some implementations of the present disclosure.

FIG. 16B illustrates a second layout 1200B of load cells in a smart scale system (e.g., the smart scale system 100, the smart scale system 200, the smart scale system 300, the smart scale system 400, the smart scale system 700, the smart scale system 800, the smart scale system 900, the smart scale system 1000, and the smart scale system 1100). In this layout 1200B, the plurality of load cells includes six (6) of the load cells 1221 as those shown in FIG. 16A. In some implementations, in this layout 1200B, the plurality of load cells includes one two-by-three array of load cells.

Figure 16C:
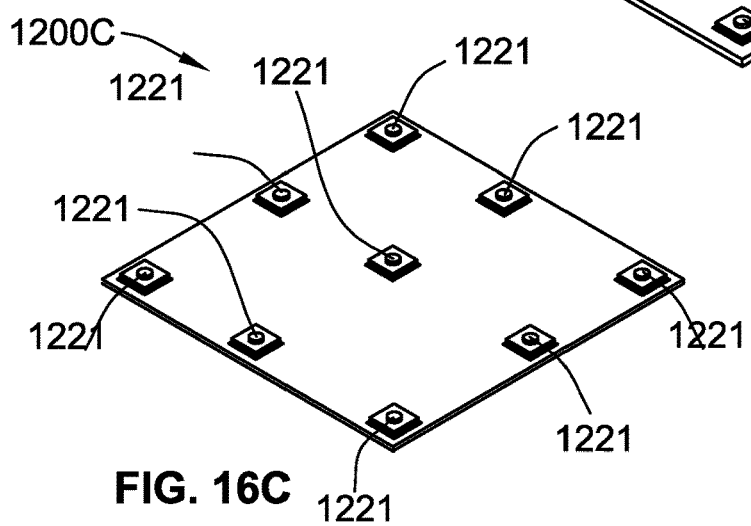
FIG. 16C illustrates a third layout of load cells in a smart scale system, according to some implementations of the present disclosure.

FIG. 16C illustrates a third layout 1200C of load cells in a smart scale system (e.g., the smart scale system 100, the smart scale system 200, the smart scale system 300, the smart scale system 400, the smart scale system 700, the smart scale system 800, the smart scale system 900, the smart scale system 1000, and the smart scale system 1100). In this layout 1200C, the plurality of load cells includes nine (9) of the load cells 1221. In some implementations, in this layout 1200C, the plurality of load cells includes one three-by-three array of load cells.

Figure 16D:
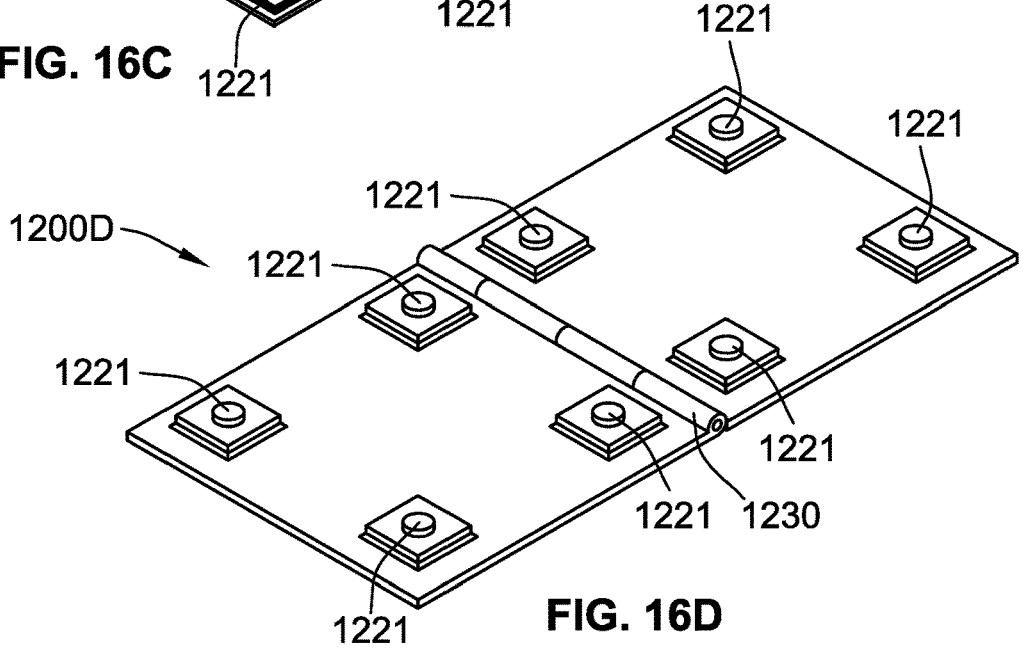
FIG. 16D illustrates a fourth layout of load cells in a smart scale system, according to some implementations of the present disclosure.

FIG. 16D illustrates a fourth layout 1200D of load cells of load cells in a smart scale system (e.g., the smart scale system 100, the smart scale system 200, the smart scale system 300, the smart scale system 400, the smart scale system 700, the smart scale system 800, the smart scale system 900, the smart scale system 1000, and the smart scale system 1100). In this layout 1200D, the plurality of load cells includes eight (8) single load cells 1221. In some implementations, in this layout 1200D, the plurality of load cells includes two of the four-by-four arrays of load cells described above. In some implementations, the fourth layout 1200D includes two smart scale systems having the first layout 1200A coupled to each other via one or more hinges 1230.

According to some implementations of the present disclosure, the array of pressure sensors can include a pressure sensing sheet having a material used with its thickness (e.g., a 3-dimensional sensor), and/or with its surface (e.g., a coplanar sensor). In some implementations, this material is an isolating polymer charged in conductive particles. A low current can pass through tunnel effect from a conductive particle to another. In some implementations, this material is deformable. In addition, distances between the conductive particles change with the applied vertical pressure (cf. FIGS. 20A-20B).

Figure 20A:
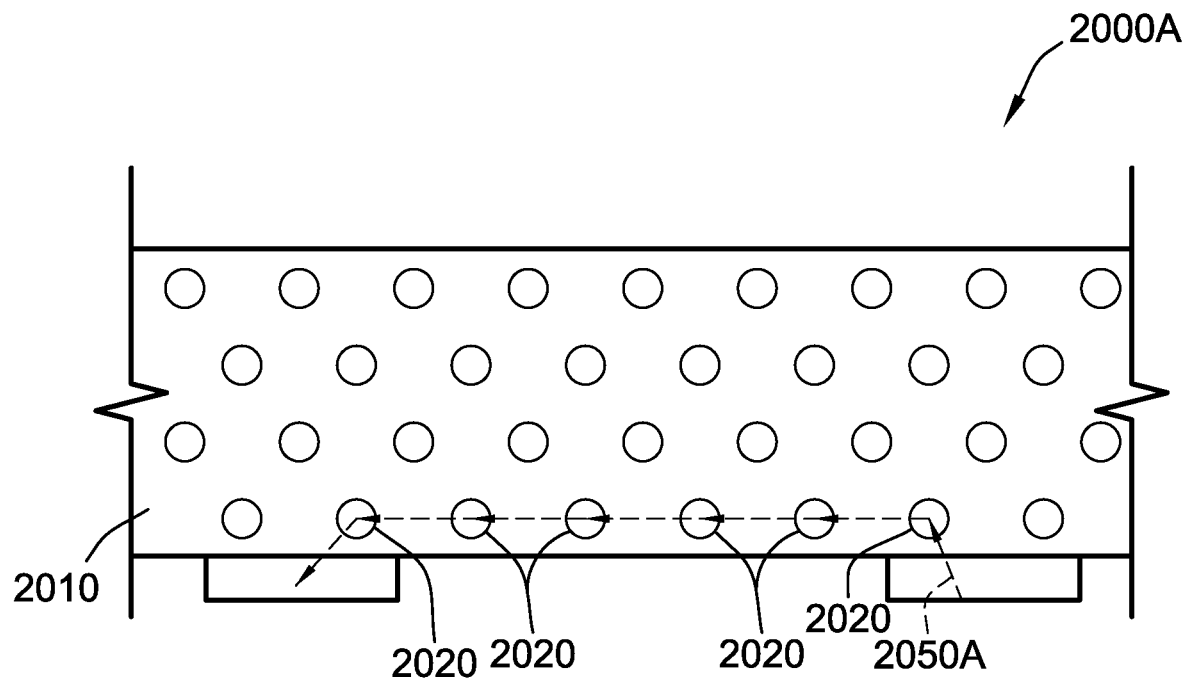
FIG. 20A illustrates the current in a pressure sensing sheet prior to vertically applied pressure, according to some implementations of the present disclosure.
Figure 20B:
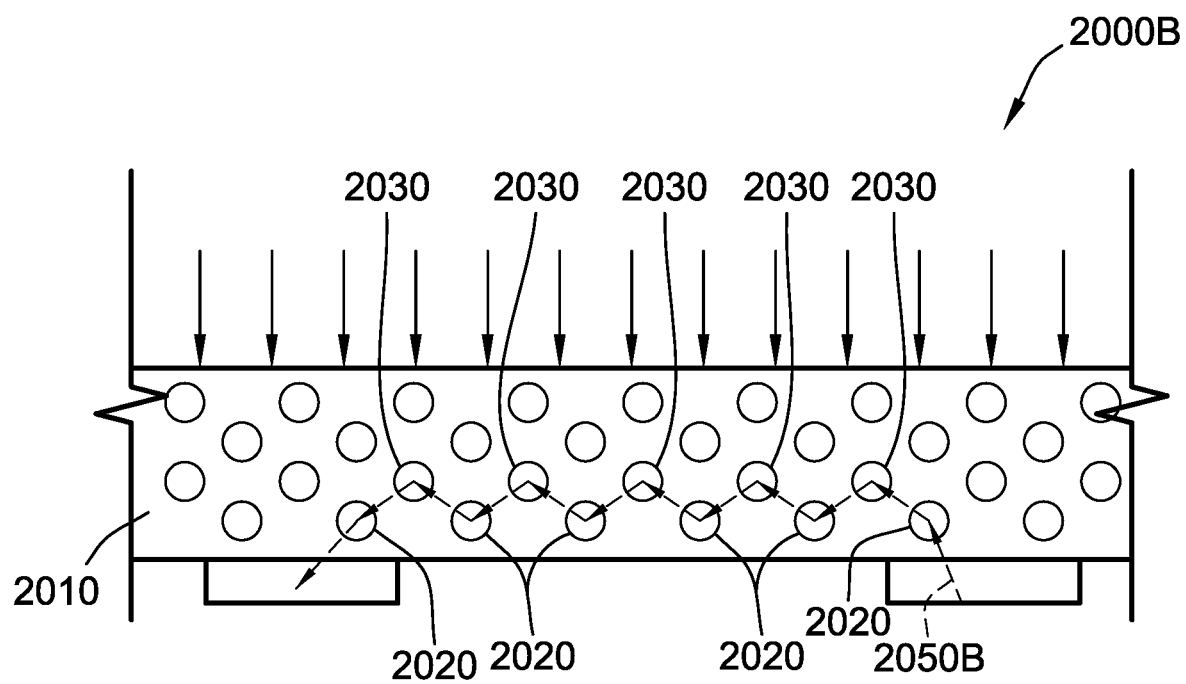
FIG. 20B illustrates the current in the pressure sensing sheet of FIG. 20A after vertically applied pressure, according to some implementations of the present disclosure.

FIG. 20A illustrates a first scheme 2000A in a pressure sensing sheet 2010 prior to vertically applied pressure, according to some implementations of the present disclosure. The current 2050A travels through the conductive particles 2020. FIG. 20B illustrates a second scheme 2000B in the pressure sensing sheet 2010 after vertically applied pressure, according to some implementations of the present disclosure. The current 2050B travels through the conductive particles 2020 and the adjacent conductive particles 2030.

The conductive particles are closer when the material is under pressure (FIG. 20B), where the contribution of tunnel effect to the current circulation raises. The relationship between the impedance and the applied force can be written as:

$$R = \frac{pK}{F} \quad (1)$$

where p is the resistivity of the contact surfaces; F is the normal force to the surface; and K is a function depending, inter alia, on the elasticity of the material.

However, K is not a constant, and the relationship between pressure and resistivity is not linear. Otherwise, crushing the material is only possible if the material itself can freely lengthen in the two other dimensions, which is not the case here: the deformation can only be local.

Thus, in some implementations, the value to measure is a resistance. The resistance here is not linear to the pressure. Further, the pressure variation is not easily measurable on the required pressure slot.

In some implementations, a 3-dimensional sensor is not optimal because its variation of the resistance with the pressure is not enough under high pressure. Thus, the industrialization of the array of pressure sensors is more complex, and it is difficult to have a sensor geometry that satisfies the need of multiple sensors in a small area (e.g., four sensors per square centimeter). Indeed, in such conditions, an individual sensor can only take space up to 2.5×2.5 mm², which would highly reduce the resistance of the individual sensor.

For a coplanar sensor, the measurable magnitude is its resistance. To limit the consumption of the array of pressure sensors and/or to limit cross-talk between the adjacent pressure sensors, the value of resistance must be as large as possible. In some implementations, the variation in resistance is significant over the range of use of the array of pressure sensors, such that the slope of the characteristic is steep enough on the whole scale to have a correct definition. Accordingly, a preferred geometry allows efficient paving of the plane.

Figure 21:
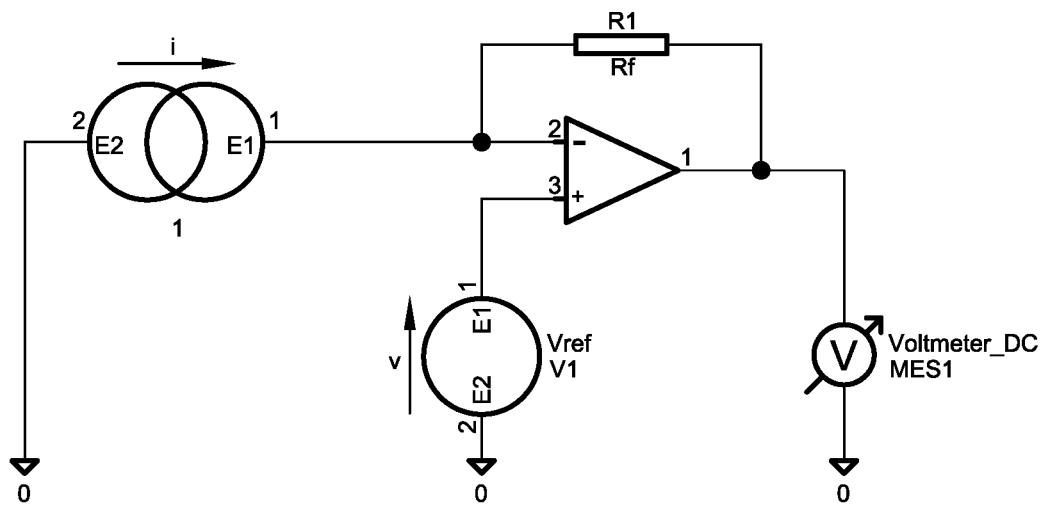
FIG. 21 illustrates a transimpedance amplifier, according to some implementations of the present disclosure.

Because the value to measure is resistance, one solution is to use a transimpedance amplifier (TIA). FIG. 21 illustrates a circuit diagram 2100 in the transimpedance amplifier, according to some implementations of the present disclosure. The circuit is powered using an asymmetric power supply. The transimpedance amplifier is equipped of a virtual stable ground, where the internal impedance is as low as possible.

The relationship between the input current i and the output voltage $V_{MES_1}$ is given in first approximation by the equation:

$$V_{MES_1} = V_{ref} - iR_f \qquad (2)$$

However, the array of pressure sensors cannot settle with this first approximation. If c is the differential voltage, such as:

$$\epsilon = V_+ - V_- \qquad (3)$$

With this new notation, the relationship between the measured current and the output voltage becomes:

$$V_{MES_1} = V_{ref} \epsilon - iR_f \qquad (4)$$

Yet the value to be measured is the sensor resistance, which will allow us to calculate the current i thanks to the characteristic of the operational amplifier forcing. When in the linear mode, the voltage is $V_-$. With the resistance of the sensor $R_c$, the scheme becomes is illustrated in FIG. 22, which shows a circuit diagram 2200 in a transimpedance amplifier, according to some implementations of the present disclosure.

Figure 22:
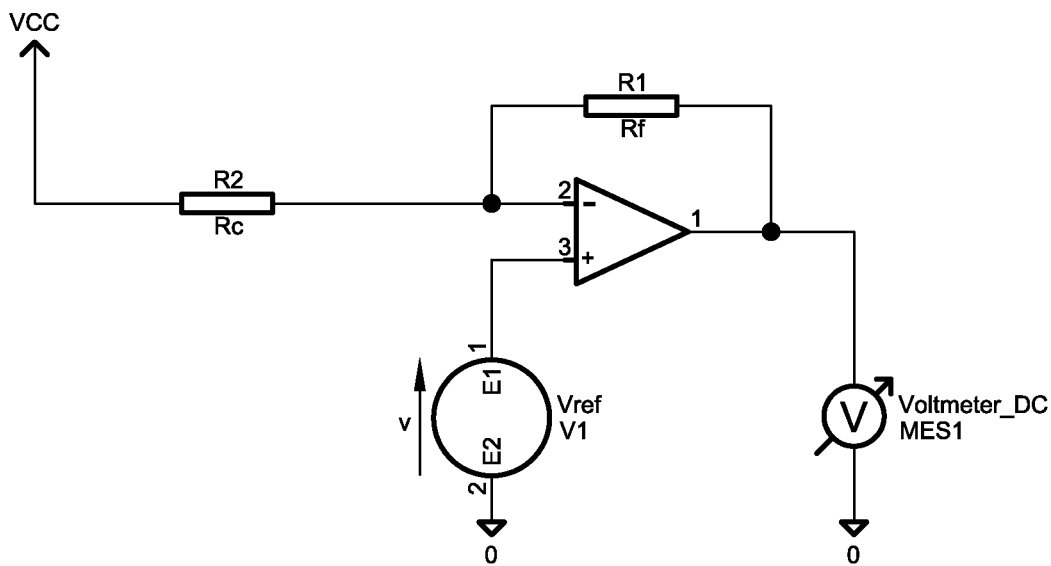
FIG. 22 illustrates another transimpedance amplifier, according to some implementations of the present disclosure.

The current in FIG. 22 circulates in the same direction as that in FIG. 21. The output voltage is now given by the equation:

$$V_{MES_1} = V_{ref} - \epsilon - \frac{V_{cc} - V_{ref} + \epsilon}{R_c} R_f \qquad (5)$$

In some implementations, the power supply uses a supply $V_{cc}$ of 5 V, and requires the use of amplifiers having rail to rail in outputs. Nevertheless, the limitation of this supply voltage force a constraint on the choice of the resistance $R_f$. As such, the limits condition is given by the equation:

$$V_{ref} - \epsilon - \frac{V_{cc} - V_{ref} + \epsilon}{R_c} R_f = 0 \qquad (6)$$

In some implementations, f is very low, and can be close to 0. Therefore, by setting f as equal to 0, we have:

$$R_f \leq R_c \qquad (7)$$

The resistance of the sensor $R_c$ highly varies. In order to avoid the amplifier saturation, a resistance $R_f$ lower or equal to the minimum impedance of the array of pressure sensors is implemented. In order to limit the consumption of the amplifier, a resistance $R_f$ is chosen to be the resistance of the array of pressure sensors when put under maximum pressure, relatively to the specifications.

Furthermore, a coplanar sensor alone can only measure an average pressure on the surface that is between its two electrodes. It cannot measure a precise image of the applied pressure. In order to obtain an image that is more precise, a juxtaposition of sensors is used, which raises the question of the disposition of those sensors on a plane.

To solve the above problems, the present disclosure provides the optimal geography of planar paving, such as what is illustrated in the second sheet 1182 of the smart scale system 1100 in FIG. 14. The distance between adjacent sensors (e.g., between the electrically conductive trace pattern 1112A and the electrically conductive trace pattern 1112B) must be sufficient to avoid crosstalk, especially if the outer ring (e.g., the outer ring 1103 shown in FIG. 15A) was not complete all-around (e.g., where the second distance θ is less than 360°). Indeed, the resistance of the sensor is proportional to the perimeter of the outer ring, and to the distance between two electrodes. In some implementations, the perimeter of the outer ring is limited (e.g., the outer ring is not a complete ring, and θ is less than 360°) in order to raise the resistance of the sensor. In other words, if there is less contact (e.g., having an unfinished ring), there is more resistance.

Figure 17A:
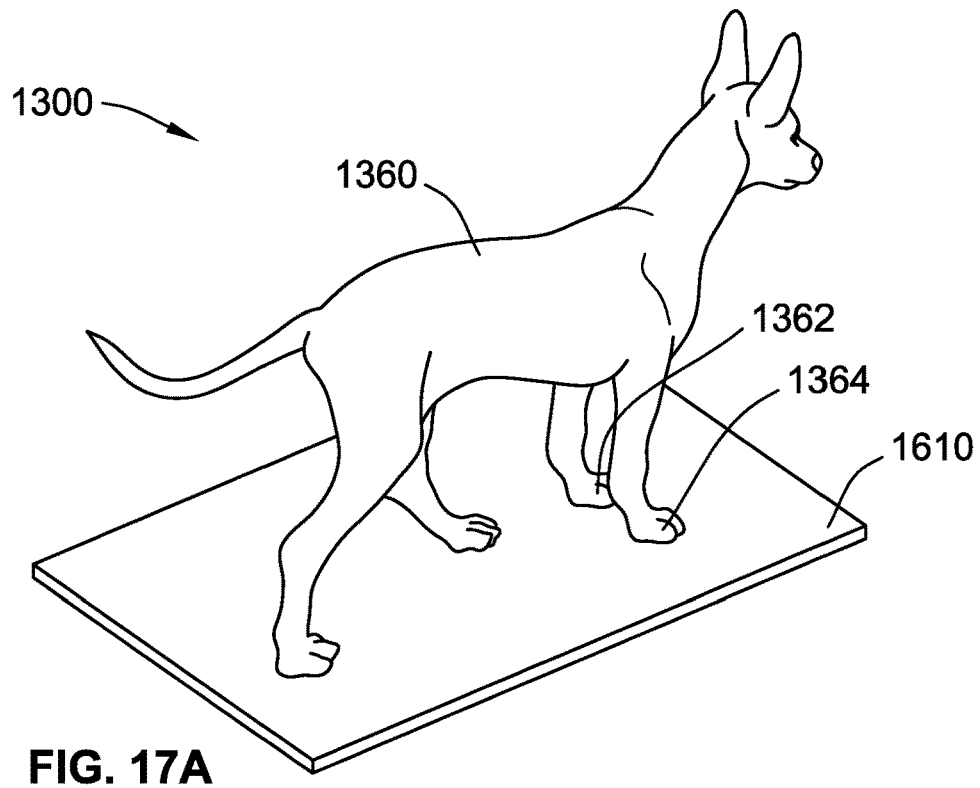
FIG. 17A illustrates a dog on a smart scale system, according to some implementations of the present disclosure.

Referring to FIG. 17A, a smart scale system 1300 is the same as, or similar to, the smart scale system 1000 or the smart scale system 1100, except that the smart scale system 1300 is modified for pets, such as a cat, a dog, a horse, a hamster, a guinea pig, a rabbit, a chinchilla, a mouse, a rat, a parrot, a hermit crab, a ferret, a reptile, a fish, a sea monkey, or any combination thereof. In some implementations, the smart scale system is customized for any non-static item that moves, walks, crawls, rolls across the weighing plane. For example, the smart scale system 1300 calculates an average of the weight measured, ignoring the landing part and the leaving part.

As shown in FIG. 17A, a dog 1360 is using the smart scale system 1300. For example, the dog 1360 steps on the smart scale system 1300, the measured weight goes from 0 to 30 kg and then goes around 23 kg for a number seconds. Then the dog 1360 leaves, and the measured weight goes down. The smart scale system 1300 then averages every value measured during the number seconds, and thus determines the weight for the dog 1360 is 23 kg. In other words, in some implementations, the weight for a non-static item can be estimated from the moment it oscillates around a specific value, which is indicative of the actual weight of the non-static item.

Figure 17B:
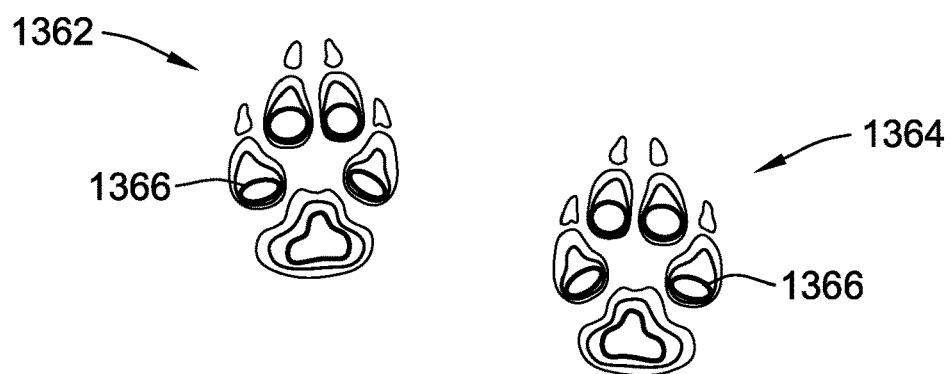
FIG. 17B illustrates a pressure map of two paws of a dog of a smart scale system, according to some implementations of the present disclosure.

Depending on the type of the pet, the layout and/or properties of the load cells differ. For example, a smart scale system customized for dogs includes a weight range of between about 0.3 kilograms to about 100 kilograms. As disclosed herein, the array of pressure sensors in the smart scale system can be configured to sense pressure data. FIG. 17B illustrates a pressure map 1366 of two paws 1362 and 1364 of the dog (or other types of pets) of the smart scale system, according to some implementations of the present disclosure. In some implementations, pressure data of all four paws of the dog are measured, and included in the pressure map 1366. The pressure map 1366 is representative of a pressure gradient associated with the two paws 1362 and 1364. Further, the pressure map 1366 can be indicative of a weight distribution of the dog.

Used in conjunction with the pressure map 1366 or without the pressure map 1366, the pressure data can be used to generate additional information associated with the dog (or other types of pets), in the same or similar manner as what is illustrated in FIG. 7 and described accordingly. Further, the pressure map 1366 can include pressure points for the paws. As such, the pressure map 1366 can aid in detecting various ailments and/or illnesses of the dog (or other types of pets), instantaneously and/or over time, in the same or similar manner as what is illustrated in FIG. 7 and described accordingly.

Figure 17C:
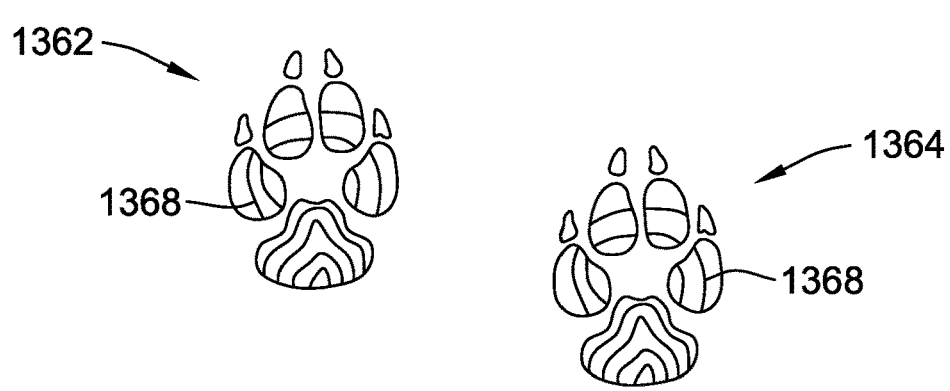
FIG. 17C illustrates a temperature map of two paws of a dog of a smart scale system, according to some implementations of the present disclosure.

In some implementations, the array of pressure sensors in the smart scale system can be configured to sense temperature data, in the same or similar manner as what is illustrated in FIG. 8 and described accordingly. For example, FIG. 17C illustrates a temperature map 1368 of two paws 1362 and 1364 of the dog (or other types of pets) of the smart scale system, according to some implementations of the present disclosure. In some implementations, temperature data of all four paws of the dog are measured, and included in the temperature map 1368. The heat from the dog can be used to power the battery of the power source of the smart mat system, such as the one illustrated in FIG. 2 of the present disclosure.

In some implementations, the weight data and/or the pressure data can be used to determine the type and/or category of the non-static item (e.g., based on a weight range, based on the footprint, based on the heat map, based on the temperature map, or any combination thereof). Alternatively or additionally, the weight data and/or the pressure data can be used to identify the user, regardless of the user being a human being or an animal.

Figure 18:
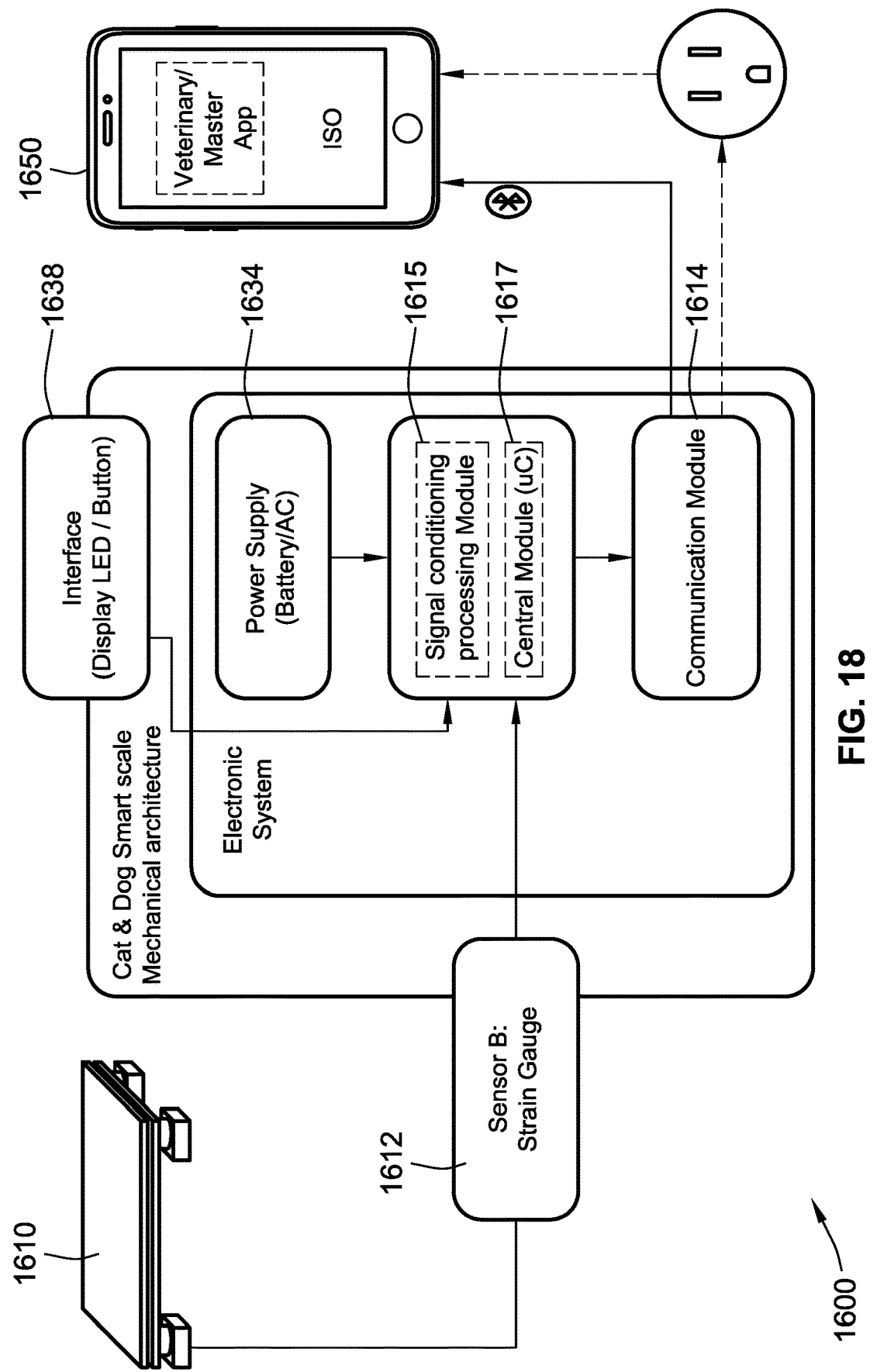
FIG. 18 is an illustrative block diagram of a smart scale system, according to some implementations of the present disclosure.

Referring now to FIG. 18, an illustrative block diagram 1600 of a smart scale system 1610 is shown, according to some implementations of the present disclosure. The smart scale system 1610 includes one or more sensors 1612, which can include one or more load cells as disclosed herein. In some implementations, the smart scale system 1610 is modified specifically to detect animals smaller than a typical human being, such as cats and dogs. In some implementations the smart scale system 1610 may further include an interface 1638, which can include a display LED and/or a button. The smart scale system 1610 also includes an electronic system, which has a power supply 1634, a signal conditioning processing module 1615, a central module 1617, a communication module 1614, or any combination thereof. The communication module 1617 is wirelessly (e.g., via Bluetooth) coupled to a mobile device, such as a mobile phone 1650. Alternatively or additionally, the communication module 1617 is coupled to a smart plug, which in turn is wirelessly coupled to the mobile device.

FIG. 19A illustrates a smart scale system 1700 adapted for using in a bed, according to some implementations of the present disclosure. In some implementations, the smart scale system 1700 is adapted for using in a baby crib, which doubles as a baby monitoring system. The smart scale system 1700 is the same as, or similar to, the smart scale system 1000, the smart scale system 1100, or the smart scale system 1300. However, the load cells 1721 of the smart scale system 1700 are located, and sometimes hidden, within the legs of the bed, whereas the array of pressure sensors 1712 is coupled to and/or embedded in the mattress. In some implementations, the smart scale system 1700 is further configured to (i) analyze the sleep quality of the user, (ii) detect sleep disorders (e.g., sleep apneas), (iii) detect sleep positions, (iv) determine changes in sleep behavior, or (v) any combination thereof.

FIG. 19B illustrates a smart scale system 1800 adapted for using in a shower, according to some implementations of the present disclosure. The smart scale system 1700 is the same as, or similar to, the smart scale system 1000, the smart scale system 1100, or the smart scale system 1300. However, the smart scale system 1800 is coupled to a shower pan 1880. In some implementations, the shower pan 1880 is made of flexi-glass, fiberglass, plastic, ceramic, or any combination thereof. The smart scale system 1800 is therefore configured to measure the weight of a user 1850 while she is showering. In some implementations, the shower pan 1880 is positioned above the smart scale system 1800, such that the shower pan 1880 prevents at least a portion of the smart scale system 1800 from getting wet.

In some implementations, the smart scale system 1800 includes load cells 1821 under the shower pan 1880, and an energy harvesting device using the water pressure and/or a turbine in the water supply. The load cells 1821 are configured to measure the vertical displacement of the shower pan. The seal on the sides of the shower pan 1880 will take off a little bit of the weight of the user 1850, because the seal will stop the shower pan to slightly go down. As such, the smart scale system 1800 is configured to adjust its estimation and/or calculation to take that off-weight into account, and add it back into the measured weight.

In some implementations, the smart scale system 1800 is powered using (i) the supplied hot and/or cold water flowing in the pipe(s) to the shower head, (ii) the drain water (e.g., with a filter to remove the hair, where the drain pipe is narrowed to increase pressure and flow, and thus increase power generation from the drain water), or (iii) both. Additionally or alternatively, the smart scale system 1800 includes a weighing system disguised as a tile, which can be embedded in the shower pan 1880, and eventually powered by a turbine that uses the water evacuation and/or supply.

Computer & Hardware Implementation of Disclosure

It should initially be understood that the disclosure herein may be implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present disclosure, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a "data processing apparatus" on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

ADDITIONAL IMPLEMENTATIONS

According to some implementations of the present disclosure, a system for determining a user profile for a user includes a mat, a camera, a display device, a processor, and a memory device. The mat includes a first sensor configured to output pressure data. The camera is configured to generate image data reproducible as one or more images of a user. The memory device is configured to receive and store therein the pressure data from the first sensor and the image data from the camera. The memory device stores machine-readable instructions that are configured to cause the processor to determine that a portion of the user is in contact with the mat based on the pressure data, the image data, or both. The processor is further caused to determine a user profile for the user based on the pressure data, the image data, or both. The user profile includes a posture of the user. The posture of the user is determined by comparing the pressure data, the image data, or both, to one or more predetermined postures stored in the memory device. The processor is also caused to display, on the display device, information associated with the determined user profile.

According to some implementations of the present disclosure, a system for determining a user profile for a user includes a mat, a camera, a display device, a processor, and a memory device. The mat includes a first sensor configured to output pressure data. The camera is configured to generate image data reproducible as one or more images of a user. The memory device is configured to receive and store therein the pressure data from the first sensor and the image data from the camera. The memory device stores machine-readable instructions that are configured to cause the processor to determine that a portion of the user is in contact with the mat based on the pressure data, the image data, or both. The processor is further caused to determine a user profile for the user based on the pressure data and the image data. The user profile includes a posture of the user. The posture of the user is determined by comparing the pressure data and the image data to one or more predetermined postures stored in the memory device. The processor is also caused to display, on the display device, information associated with the determined user profile.

According to some implementations of the present disclosure, a system for determining a user profile for a user includes a mat, a display device, a processor, and a memory. The mat includes a battery, a first sensor configured to output pressure data, and a second sensor configured to output temperature data. The second sensor includes a transducer configured to convert thermal energy into electrical energy for charging the battery. The memory device is configured to receive and store therein the pressure data from the first sensor and the temperature data from the second sensor. The memory device stores machine-readable instructions configured to cause the processor to determine that a portion of the user is in contact with the mat based on the pressure data, the temperature data, or both. The processor is further configured to determine a user profile for the user based on the pressure data and the temperature data. The user profile includes a posture of the user. The posture of the user is determined by comparing the pressure data and the temperature data to one or more predetermined postures stored in the memory device. The processor is also caused to display, on the display device, information associated with the determined user profile.

According to some implementations of the present disclosure, a method for determining a posture of a user includes receiving pressure data and image data from a smart scale system. The smart scale system includes a mat, a camera, and a display device. The mat has a first sensor configured to output pressure data. The camera is configured to generate image data reproducible as one or more images of a user. The method further includes: storing, on a memory device, the received pressure data and the received image data; determining that a portion of the user is in contact with the mat based on the received pressure data, the received image data, or both; comparing the received pressure data, the received image data, or both, to one or more predetermined postures stored in the memory device; based at least in part on the comparing, determining a user profile for the user, the user profile including a posture of the user; and displaying, on the display device, information associated with the determined user profile.

According to some implementations of the present disclosure, a smart scale system includes a substrate, a plurality of load cells coupled to a first side of the substrate, an array of pressure sensors coupled to a second opposing side of the substrate, a memory, and a control system. The plurality of load cells is configured to generate weight data associated with a user. The array of pressure sensors is configured to generate pressure data associated with the user. The memory stores registered user data and machine-readable instructions. The control system is coupled to the memory and arranged to provide control signals to one or more processors configured to execute the machine-readable instructions. The weight data is received from the plurality of load cells. The pressure data is received from the array of pressure sensors. Based at least in part on the pressure data and the registered user data, the user is a non-registered user of the smart scale system is determined. A prompt is displayed, on a display device, for the user to register as a registered user of the smart scale system.

According to some implementations of the present disclosure, a smart scale system includes a substrate, a plurality of load cells coupled to a first side of the substrate, an array of pressure sensors coupled to a second opposing side of the substrate, a memory, and a control system. The plurality of load cells is configured to generate weight data associated with a user. The array of pressure sensors is configured to generate pressure data associated with the user. The memory stores registered user data and machine-readable instructions. The control system is coupled to the memory and arranged to provide control signals to one or more processors configured to execute the machine-readable instructions. The weight data is received from the plurality of load cells. The pressure data is received from the array of pressure sensors. Based at least in part on the pressure data and the registered user data, the user is a registered user of the smart scale system is determined. A prompt is displayed, on a display device, for the user to input information to be associated with the received weight data.

According to some implementations of the present disclosure, a method for determining a normalized weight of a user is disclosed. Registered user data is received from a memory of a smart scale system. The registered user data includes historical weight data, historical user information, and historical normalized weight data. A machine learning algorithm is trained with the historical weight data, the historical user information, and the historical normalized weight data. Pressure data associated with the user is received from an array of pressure sensors of the smart scale system. Current weight data associated with the user is received from a plurality of load cells of the smart scale system. Based at least in part on the pressure data and the registered user data, it is determined that the user is a registered user of the smart scale system. A prompt is displayed, on a display device, for the user to input information to be associated with the current weight data. In response to the prompt, current user information is received. The current weight data associated with the user and the current user information are received as an input for the machine learning algorithm. The normalized weight for the user is generated as an output for the machine learning algorithm.

SELECTED EMBODIMENTS AND IMPLEMENTATIONS

Although the above description and the attached claims disclose a number of embodiments and/or implementations of the present disclosure, other alternative aspects of the disclosure are disclosed in the following further embodiments.

Embodiment 1. A system for determining a user profile for a user, the system comprising:
  a mat including a first sensor configured to output pressure data;
  a camera configured to generate image data reproducible as one or more images of a user;

a display device;
a processor; and
a memory device, the memory device being configured to receive and store therein the pressure data from the first sensor and the image data from the camera, the memory device storing machine-readable instructions configured to cause the processor to:
  determine that a portion of the user is in contact with the mat based on the pressure data, the image data, or both;
  determine a user profile for the user based on the pressure data, the image data, or both, the user profile including a posture of the user, the posture of the user being determined by comparing the pressure data, the image data, or both, to one or more predetermined postures stored in the memory device; and
  display, on the display device, information associated with the determined user profile.

Embodiment 2. The system of embodiment 1, wherein the memory device is further configured to cause the processor to determine an identity of the user based on the pressure data, the image data, or both.

Embodiment 3. The system of embodiment 2, wherein the determining the identity of the user includes using a machine learning algorithm.

Embodiment 4. The system of any one of embodiments 1 to 3, wherein the user profile includes a shape of the portion of the user, a dimension of the portion of the user, or both.

Embodiment 5. The system of embodiment 4, wherein the displayed information associated with the determined user profile includes a first indicium indicative of the weight of the user, a second indicium indicative of the posture of the user, a third indicium indicative of the shape of the portion of the user, a fourth indicium indicative of the dimension of the portion of the user, or any combination thereof.

Embodiment 6. The system of any one of embodiments 1 to 5, wherein the mat includes a second sensor configured to output temperature data.

Embodiment 7. The system of embodiment 6, wherein the memory device is further configured to cause the processor to determine that the portion of the user is in contact with the mat based on the temperature data.

Embodiment 8. The system of any one of embodiments 1 to 7, wherein the camera is coupled to a mobile device.

Embodiment 9. The system of any one of embodiments 1 to 8, wherein the mat further includes a battery and an energy harvester, the energy harvester being configured to harvest energy for charging the battery.

Embodiment 10. The system of embodiment 9, wherein the energy harvester is a transducer configured to convert thermal energy into electrical energy for charging the battery.

Embodiment 11. The system of embodiment 10, wherein the transducer is coupled to a second sensor configured to output temperature data.

Embodiment 12. The system of any one of embodiments 1 to 11, wherein the display device includes a user interface configured to receive input data associated with the user.

Embodiment 13. The system of embodiment 12, wherein the input data includes an age of the user, a gender of the user, or both.

Embodiment 14. The system of any one of embodiments 1 to 13, wherein the memory device is further configured to cause the processor to determine a wellness plan for the user based on the determined user profile, and the displayed information associated with the determined user profile includes an indicium indicative of wellness of the user.

Embodiment 15. The system of embodiment 14, wherein the wellness plan is an exercise schedule.

Embodiment 16. The system of any one of embodiments 1 to 15, wherein the memory device is further configured to cause the processor to determine a posture score based on the comparing the pressure data, the image data, or both, to the one or more predetermined postures, the posture score being indicative of poor posture of the user.

Embodiment 17. The system of any one of embodiments 1 to 16, wherein the memory device is further configured to cause the processor to determine a posture correction plan associated with the user based on the comparing the pressure data, the image data, or both, to the one or more predetermined postures.

Embodiment 18. The system of any one of embodiments 1 to 17, wherein the processor and the memory device are coupled to the mat.

Embodiment 19. The system of any one of embodiments 1 to 18, wherein the display device, the processor, and the memory device are coupled to a remote device.

Embodiment 20. The system of any one of embodiments 1 to 19, wherein the display device is coupled to a mirror, a carpet, the mat, or a mobile device.

Embodiment 21. The system of any one of embodiments 1 to 20, wherein the portion of the user is a portion of a foot of the user.

Embodiment 22. The system of any one of embodiments 1 to 21, wherein the mat is flexible.

Embodiment 23. The system of embodiment 22, wherein the mat is configured to move between a generally planar configuration and a generally cylindrical configuration.

Embodiment 24. The system of any one of embodiments 1 to 23, wherein the first sensor is a CMOS integrated silicon pressure sensor.

Embodiment 25. The system of any one of embodiments 1 to 24, wherein the first sensor is a piezoelectric sensor.

Embodiment 26. The system of any one of embodiments 1 to 25, wherein the first sensor includes an embedded layer of liquid, the embedded layer being configured to detect pressure on the mat.

Embodiment 27. The system of embodiment 26, wherein the first sensor is a layer stacked pressure sensor comprising a liquid metal-embedded elastomer.

Embodiment 28. The system of any one of embodiments 1 to 27, wherein the memory device is further configured to cause the processor to determine an active period based on the determining that the portion of the user is in contact with the mat.

Embodiment 29. The system of embodiment 28, further comprising a virtual reality device configured to receive the pressure data from the first sensor and the image data from the camera during the active period and display digital information based on the received data.

Embodiment 30. The system of embodiment 29, wherein the display device is coupled to the virtual reality device.

Embodiment 31. The system of any one of embodiments 1 to 30, wherein the display device is communicatively coupled to the processor via Bluetooth.

Embodiment 32. The system of any one of embodiments 1 to 31, wherein the mat is disposable.

Embodiment 33. A system for determining a user profile for a user, the system comprising:
  a mat including a first sensor configured to output pressure data;
  a camera configured to generate image data reproducible as one or more images of a user;

a display device;
a processor; and
a memory device, the memory device being configured to receive and store therein the pressure data from the first sensor and the image data from the camera, the memory device storing machine-readable instructions configured to cause the processor to:
determine that a portion of the user is in contact with the mat based on the pressure data, the image data, or both;
determine a user profile for the user based on the pressure data and the image data, the user profile including a posture of the user, the posture of the user being determined by comparing the pressure data and the image data to one or more predetermined postures stored in the memory device; and
display, on the display device, information associated with the determined user profile.

Embodiment 34. A system for determining a user profile for a user, the system comprising:
a mat including a battery, a first sensor configured to output pressure data, and a second sensor configured to output temperature data, wherein the second sensor includes a transducer configured to convert thermal energy into electrical energy for charging the battery;
a display device;
a processor; and
a memory device, the memory device being configured to receive and store therein the pressure data from the first sensor and the temperature data from the second sensor, the memory device storing machine-readable instructions configured to cause the processor to:
determine that a portion of the user is in contact with the mat based on the pressure data, the temperature data, or both;
determine a user profile for the user based on the pressure data and the temperature data, the user profile including a posture of the user, the posture of the user being determined by comparing the pressure data and the temperature data to one or more predetermined postures stored in the memory device; and
display, on the display device, information associated with the determined user profile.

Embodiment 35. A method for determining a posture of a user, the method comprising:
receiving pressure data and image data from a smart scale system, the smart scale system including:
a mat having a first sensor configured to output pressure data,
a camera configured to generate image data reproducible as one or more images of a user, and
a display device;
storing, on a memory device, the received pressure data and the received image data;
determining that a portion of the user is in contact with the mat based on the received pressure data, the received image data, or both;
comparing the received pressure data, the received image data, or both, to one or more predetermined postures stored in the memory device;
based at least in part on the comparing, determining a user profile for the user, the user profile including a posture of the user; and
displaying, on the display device, information associated with the determined user profile.

Embodiment 36. A smart scale system, comprising:
a substrate;
a plurality of load cells coupled to a first side of the substrate, the plurality of load cells being configured to generate weight data associated with a user;
an array of pressure sensors coupled to a second opposing side of the substrate, the array of pressure sensors being configured to generate pressure data associated with the user;
a memory storing registered user data and machine-readable instructions; and
a control system coupled to the memory and arranged to provide control signals to one or more processors configured to execute the machine-readable instructions to:
receive, from the plurality of load cells, the weight data;
receive, from the array of pressure sensors, the pressure data;
based at least in part on the pressure data and the registered user data, determine that the user is a non-registered user of the smart scale system; and
cause to be displayed, on a display device, a prompt for the user to register as a registered user of the smart scale system.

Embodiment 37. The smart scale system of embodiment 36, further comprising a cover layer.

Embodiment 38. The smart scale system of embodiment 37, wherein the cover layer includes a sheet of fabric.

Embodiment 39. The smart scale system of embodiment 38, wherein the sheet of fabric includes two electrically conductive fabric portions spaced from each other.

Embodiment 40. The smart scale system of embodiment 39, wherein the two electrically conductive fabric portions are spaced from each other at least 3 inches.

Embodiment 41. The smart scale system of any one of embodiments 36 to 40, wherein the substrate is one or more pieces of glass.

Embodiment 42. The smart scale system of embodiment 41, wherein the substrate includes two pieces of glass coupled together via one or more hinges.

Embodiment 43. The smart scale system of any one of embodiments 36 to 42, further comprising a plurality of rigid feet.

Embodiment 44. The smart scale system of embodiment 43, wherein each of the plurality of rigid feet is directly coupled to a respective one of the plurality of load cells.

Embodiment 45. The smart scale system of embodiment 44, further comprising a base cover, the base cover being coupled to the substrate such that the plurality of load cells, the memory, and the control system are at least partially positioned between the base cover and the substrate.

Embodiment 46. The smart scale system of embodiment 45, wherein the base cover includes a plurality of apertures, and wherein each of the plurality of rigid feet protrudes at least partially through at least one of the plurality of apertures.

Embodiment 47. The smart scale system of any one of embodiments 36 to 46, wherein the plurality of load cells is configured to generate the weight data in response to the user engaging the smart scale system.

Embodiment 48. The smart scale system of embodiment 47, wherein the user engaging the smart scale system includes the user standing on a cover layer of the smart scale system.

Embodiment 49. The smart scale system of any one of embodiments 36 to 48, wherein the plurality of load cells includes a four-by-four array of load cells, the four-by-four array of load cells being coupled to an analog to digital converter.

Embodiment 50. The smart scale system of any one of embodiments 36 to 49, wherein the plurality of load cells includes four of the four-by-four arrays of load cells, each of the four-by-four arrays of load cells being coupled to a respective analog to digital converter.

Embodiment 51. The smart scale system of any one of embodiments 36 to 50, wherein the array of pressure sensors is configured to generate the pressure data in response to the user engaging the system.

Embodiment 52. The smart scale system of embodiment 51, wherein the user engaging the smart scale system includes the user standing on a cover layer of the smart scale system.

Embodiment 53. The smart scale system of any one of embodiments 36 to 52, wherein the array of pressure sensors includes a 100×70 matrix of pressure sensors.

Embodiment 54. The smart scale system of any one of embodiments 36 to 53, wherein the array of pressure sensors includes a first sheet, a second sheet, and a third sheet;

Embodiment 55. The smart scale system of embodiment 54, wherein the second sheet includes a piezoresistive sheet that is positioned between the first sheet and the third sheet.

Embodiment 56. The smart scale system of embodiment 55, wherein the first sheet includes a plurality of electrically conductive rows.

Embodiment 57. The smart scale system of embodiment 56, wherein the third sheet includes a plurality of electrically conductive columns.

Embodiment 58. The smart scale system of embodiment 57, wherein the intersection of each of the plurality of electrically conductive rows with each of the plurality of electrically conductive columns defines a pressure sensor of the array of pressure sensors.

Embodiment 59. The smart scale system of any one of embodiments 36 to 58, further comprising a generally opaque layer coupled to the array of pressure sensors.

Embodiment 60. The smart scale system of embodiment 59, further comprising a bioelectrical impedance system configured to generate bioelectrical impedance data associated with the user, the bioelectrical impedance system including a plurality of electrodes configured to conductively contact the user and form a first closed circuit with the user.

Embodiment 61. The smart scale system of embodiment 60, wherein at least one of the plurality of electrodes is positioned between the generally opaque layer and a cover layer of the smart scale system, the cover layer including an electronically conductive fabric portion.

Embodiment 62. The smart scale system of any one of embodiments 60 to 61, wherein the plurality of electrodes includes a first pair of electrodes that forms the first closed circuit with the user.

Embodiment 63. The smart scale system of embodiment 62, wherein the first pair of electrodes is configured to contact a first foot of the user.

Embodiment 64. The smart scale system of any one of embodiments 62 to 63, wherein the first pair of electrodes is coupled to a bioelectrical impedance module of the bioelectrical impedance system, and wherein the first pair of electrodes is configured to measure a current of the first closed circuit and generate current data.

Embodiment 65. The smart scale system of any one of embodiments 62 to 64, wherein the plurality of electrodes further includes a second pair of electrodes configured to conductively contact the user and form a second closed circuit with the user.

Embodiment 66. The smart scale system of embodiment 65, wherein the second pair of electrodes is configured to contact a second foot of the user.

Embodiment 67. The smart scale system of any one of embodiments 65 to 66, wherein the second pair of electrodes is configured to measure a voltage of the second closed circuit and generate voltage data.

Embodiment 68. The smart scale system of any one of embodiments 36 to 67, wherein the one or more processors are further configured to execute the machine-readable instructions to:
 determine that a portion of the user is in contact with the smart scale system based at least in part on the weight data, the pressure data, or both; and
 based at least in part on the determination that the portion of the user is in contact with the smart scale system, activate a camera configured to generate image data of the user.

Embodiment 69. The smart scale system of embodiment 68, wherein the one or more processors are further configured to execute the machine-readable instructions to:
 based at least in part on the image data and the registered user data, verify that the user is a non-registered user of the smart scale system.

Embodiment 70. The smart scale system of any one of embodiments 36 to 69, wherein the one or more processors are further configured to execute the machine-readable instructions to:
 determine a load cell weight for the user based on the received weight data;
 based at least in part on a determination that the load cell weight does not exceed a predetermined threshold, display the load cell weight on the display device as an actual weight for the user; and
 based at least in part on a determination that the load cell weight exceeds the predetermined threshold, (i) estimate a pressure sensor weight for the user based at least in part on the received pressured data, and (ii) display the pressure sensor weight on the display device as the actual weight for the user.

Embodiment 71. The smart scale system of any one of embodiments 36 to 70, wherein the one or more processors are further configured to execute the machine-readable instructions to:
 determine a load cell weight for the user based on the received weight data;
 receive, as an input for a machine learning algorithm, the load cell weight of the user; and
 generate, as an output for the machine learning algorithm, a normalized weight for the user.

Embodiment 72. The smart scale system of embodiment 71, wherein the machine learning algorithm further receives, as the input, a reason for adjustment, the reason for adjustment including (i) a state of the user being dressed or undressed, (ii) a status of the user's recent use of bathroom, (iii) a time when the user last ate and/or drank, (iv) a type of food of the user's last meal, (v) a shower status; or (vi) any combination thereof.

Embodiment 73. The smart scale system of embodiment 72, wherein the one or more processors are further configured to execute the machine-readable instructions to:
 display, on the display device, the load cell weight for the user, the normalized weight for the user, the reason for adjustment, or any combination thereof.

Embodiment 74. The smart scale system of any one of embodiments 71 to 73, wherein the one or more processors are further configured to execute the machine-readable instructions to:
receive historical data, the historical data including historical load cell weight data and historical normalized weight data; and
train the machine learning algorithm with the received historical data.

Embodiment 75. The smart scale system of embodiment 74, wherein the historical data is associated with other users.

Embodiment 76. The smart scale system of any one of embodiments 74 to 75, wherein the historical data is associated with the user of the smart scale system.

Embodiment 77. The smart scale system of any one of embodiments 60 to 76, wherein the one or more processors are further configured to execute the machine-readable instructions to:
determine, based at least in part on the bioelectrical impedance data, an estimated body composition of the user, the estimated body composition including a body fat and a muscle mass.

Embodiment 78. The smart scale system of any one of embodiments 36 to 77, wherein the one or more processors are further configured to execute the machine-readable instructions to:
generate, based at least in part on the pressure data, a pressure heat map associated with the user.

Embodiment 79. The smart scale system of embodiment 78, wherein the pressure heat map is representative of a pressure gradient associated with feet of the user and indicative of a weight distribution of the user.

Embodiment 80. The smart scale system of any one of embodiments 36 to 79, wherein the one or more processors are further configured to execute the machine-readable instructions to:
calculate, based at least in part on the pressure data, a length of a foot of the user.

Embodiment 81. The smart scale system of embodiment 80, wherein the one or more processors are further configured to execute the machine-readable instructions to:
estimating, based at least in part on the calculated length of the foot, a shoe size for the user.

Embodiment 82. The smart scale system of any one of embodiments 36 to 81, wherein the one or more processors are further configured to execute the machine-readable instructions to:
determine, based at least in part on the pressure data, a foot profile for the user.

Embodiment 83. The smart scale system of embodiment 82, wherein the foot profile includes a selection among a high arc, a low arc, and a medium arc.

Embodiment 84. The smart scale system of embodiment 83, wherein the one or more processors are further configured to execute the machine-readable instructions to:
determine, based at least in part on the pressure data, an insole profile for the user.

Embodiment 85. The smart scale system of any one of embodiments 78 to 84, wherein the one or more processors are further configured to execute the machine-readable instructions to:
detect, based at least in part on the pressure data, whether the user has diabetic foot.

Embodiment 86. The smart scale system of any one of embodiments 36 to 85, wherein the memory and the control system are coupled to the first side of the substrate.

Embodiment 87. The smart scale system of any one of embodiments 36 to 86, wherein the display device is associated with a second user that is a registered user of the smart scale system.

Embodiment 88. The smart scale system of any one of embodiments 36 to 87, further comprising a communications network coupled to the control system, the communications network including a Bluetooth network, a Wi-Fi network, or both, the communications network being configured to couple the control system to one or more electronic devices.

Embodiment 89. The smart scale system of embodiment 88, wherein the one or more electronic devices include the display device.

Embodiment 90. A smart scale system, comprising:
a substrate;
a plurality of load cells coupled to a first side of the substrate, the plurality of load cells being configured to generate weight data associated with a user;
an array of pressure sensors coupled to a second opposing side of the substrate, the array of pressure sensors being configured to generate pressure data associated with the user;
a memory storing registered user data and machine-readable instructions; and
a control system coupled to the memory and arranged to provide control signals to one or more processors configured to execute the machine-readable instructions to:
receive, from the plurality of load cells, the weight data;
receive, from the array of pressure sensors, the pressure data;
based at least in part on the pressure data and the registered user data, determine that the user is a registered user of the smart scale system; and
cause to be displayed, on a display device, a prompt for the user to input information to be associated with the received weight data.

Embodiment 91. The smart scale system of embodiment 90, wherein the one or more processors are further configured to execute the machine-readable instructions to:
receive user information in response to the prompt; and
based at least in part on the received user information, modify the weight data to output a normalized weight.

Embodiment 92. The smart scale system of embodiment 91, wherein the one or more processors are further configured to execute the machine-readable instructions to:
cause the modified weight data to be displayed on the display device.

Embodiment 93. The smart scale system of any one of embodiments 91 to 92, wherein the user information includes (i) a state of the user being dressed or undressed, (ii) a status of the user's recent use of bathroom, (iii) a time when the user last ate and/or drank, (iv) a type of food of the user's last meal, (v) a shower status; or (vi) any combination thereof.

Embodiment 94. The smart scale system of any one of embodiments 91 to 93, wherein the one or more processors are further configured to execute the machine-readable instructions to:
determine a load cell weight for the user based on the received weight data;
receive, as an input for a machine learning algorithm, the load cell weight for the user; and
generate, as an output for the machine learning algorithm, a normalized weight for the user.

Embodiment 95. The smart scale system of any one of embodiments 90 to 94, wherein the one or more processors are further configured to execute the machine-readable instructions to:

receive historical data, the historical data including historical weight data, historical user information, and historical normalized weight data; and train the machine learning algorithm with the received historical data.

Embodiment 96. A method for determining a normalized weight of a user, the method comprising:

receiving, from a memory of a smart scale system, registered user data, the registered user data including historical weight data, historical user information, and historical normalized weight data;

training a machine learning algorithm with the historical weight data, the historical user information, and the historical normalized weight data;

receiving, from an array of pressure sensors of the smart scale system, pressure data associated with the user;

receiving, from a plurality of load cells of the smart scale system, current weight data associated with the user;

determining, based at least in part on the pressure data and the registered user data, that the user is a registered user of the smart scale system;

displaying, on a display device, a prompt for the user to input information to be associated with the current weight data;

receiving, in response to the prompt, current user information;

receiving, as an input for the machine learning algorithm, the current weight data associated with the user and the current user information; and generate, as an output for the machine learning algorithm, the normalized weight for the user.

One or more elements or aspects or steps, or any portion(s) thereof, from one or more of any of the embodiments 1-96 above and/or any of the claims 1-20 below, can be combined with one or more elements or aspects or steps, or any portion(s) thereof, from one or more of any of the other embodiments 1-96 and/or any of the claims 1-20 or combinations thereof, to form one or more additional implementations and/or claims of the present disclosure.

CONCLUSION

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

While the present disclosure has been described with reference to one or more particular embodiments and implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A method for determining a normalized weight of a user, the method performed by one or more processors of a smart scale system according to machine-readable instructions stored in a memory coupled to the one or more processors, the method comprising:
   receiving, from a plurality of load cells of the smart scale system coupled to the one or more processors, weight data associated with the user;
   receiving, as an input for a machine learning algorithm, a load cell weight determined based on the received weight data;
   receiving, from an array of pressure sensors of the smart scale system coupled to the one or more processors, pressure data associated with the user;
   receiving, from the user, an indication of a reason for adjustment of the weight data associated with the user;
   generating, based at least in part on the pressure data, a pressure heat map associated with the user, the pressure heat map, being representative of a pressure gradient associated with feet of the user;
   determining based on the pressure heat map an identity of the user; and
   generating, by the machine learning algorithm based on (i) the weight data associated with the user, (ii) the reason for adjustment of the weight data associated with the user, and (iii) the identity of the user, the normalized weight for the user.

2. The method of claim 1,
   wherein the reason for adjustment includes:
   (i) a state of the user being dressed or undressed;
   (ii) a status of the user's recent use of bathroom;
   (iii) a time when the user last ate and/or drank;
   (iv) a type of food of the user's last meal;
   (v) a shower or wetness status of the user; or
   (vi) any combination thereof.

3. The method of claim 2, further comprising:
   displaying a prompt for receiving user information via the user interface in response to determining that the user is a registered user.

4. A smart scale system, comprising:
   a plurality of load cells coupled to a first side of a substrate, the plurality of load cells being configured to generate weight data associated with a user;
   a control system including one or more processors;
   an array of pressure sensors coupled to a second opposing side of the substrate, the array of pressure sensors being configured to generate pressure data associated with the user; and
   a memory having stored thereon machine readable instructions;
   wherein the control system is coupled to the memory and configured to cause the one or more processors to execute the machine executable instructions to:
   receive, from the plurality of load cells, the weight data associated with the user;
   receive, as an input for a machine learning algorithm, a load cell weight determined based on the received weight data;
   receive, from the array of pressure sensors, the pressure data associated with the user;
   receive, from the user, an indication of a reason for adjustment of the weight data associated with the user;
   generate, based at least in part on the pressure data, a pressure heat map associated with the user, wherein the pressure heat map being representative of a pressure gradient associated with feet of the user;
   determine based on the pressure heat map, an identity of the user; and
   generate, by the machine learning algorithm based on (i) the weight data associated with the user, (ii) the reason for adjustment of the weight data associated with the user, and (iii) the identity of the user, the normalized weight for the user.

5. The smart scale system of claim 4, further comprising a cover layer.

6. The smart scale system of claim 5, wherein the cover layer includes a sheet of fabric.

7. The smart scale system of claim 6, wherein the sheet of fabric includes at least two electrically conductive fabric portions spaced from each other.

8. The smart scale system of claim 7, wherein the at least two electrically conductive fabric portions are spaced from each other at least 3 inches.

9. The smart scale system of claim 4, wherein the substrate is one or more pieces of glass.

10. The smart scale system of claim 4, wherein the plurality of load cells includes a four-by-four array of load cells, the four-by-four array of load cells being coupled to an analog to digital converter.

11. The smart scale system of claim 4, wherein the plurality of load cells includes at least four single load cells, each of the four single load cells being coupled to a respective analog to digital converter.

12. The smart scale system of claim 4, wherein the array of pressure sensors includes a first sheet and a second sheet.

13. The smart scale system of claim 12, wherein the first sheet includes a pressure sensitive sheet that is positioned adjacent to the second sheet.

14. The smart scale system of claim 13, wherein the pressure sensitive sheet includes a piezoresistive sheet that is configured to change its electrical resistance in response to pressure being applied thereto.

15. The smart scale system of claim 12, wherein the second sheet includes a plurality of electrically conductive trace patterns.

16. The smart scale system of claim 15, wherein each of the plurality of electrically conductive trace patterns defines a pressure sensor of the array of pressure sensors.

17. The smart scale system of claim 15, wherein each of the plurality of electrically conductive trace patterns includes an inner disk and an outer ring.

18. The smart scale system of claim 17, wherein the outer ring is an equilateral polygon or a perfect circle.

19. The smart scale system of claim 4, wherein the memory and the control system are coupled to the first side of the substrate.

20. The smart scale system of claim 4, wherein the reason for adjustment includes:
   (i) a state of the user being dressed or undressed;
   (ii) a status of the user's recent use of bathroom;
   (iii) a time when the user last ate and/or drank;
   (iv) a type of food of the user's last meal;
   (v) a shower or wetness status of the user; or
   (vi) any combination thereof.

* * * * *